United States Patent
Presnell et al.

(10) Patent No.: US 6,182,067 B1
(45) Date of Patent: Jan. 30, 2001

(54) METHODS AND SYSTEMS FOR KNOWLEDGE MANAGEMENT

(75) Inventors: Peter Donald Presnell, Narre Warren North; Michael Anthony White, Hoppers Crossing, both of (AU)

(73) Assignee: Knowledge Horizons PTY Ltd., Victoria (AU)

( * ) Notice: Under 35 U.S.C. 154(b), the term of this patent shall be extended for 0 days.

(21) Appl. No.: 09/086,745

(22) Filed: May 29, 1998

(30) Foreign Application Priority Data

Jun. 2, 1997 (AU) .................................................. PO7105

(51) Int. Cl.⁷ ...................................................... G06F 17/30
(52) U.S. Cl. ......................................... 707/5; 707/3; 707/7
(58) Field of Search ............................... 707/3, 5, 7, 102; 705/10; 704/7

(56) References Cited

U.S. PATENT DOCUMENTS

| | | |
|---|---|---|
| 4,823,306 | 4/1989 | Barbic et al. . |
| 5,020,019 | 5/1991 | Ogawa . |
| 5,404,506 | 4/1995 | Fujisawa et al. . |
| 5,428,778 | 6/1995 | Brookes . |
| 5,535,382 * | 7/1996 | Ogawa ................................. 395/600 |
| 5,537,586 | 7/1996 | Amram et al. . |
| 5,544,049 * | 8/1996 | Henderson et al. ................. 364/419 |
| 5,737,556 * | 4/1998 | Yasunaga ............................ 395/339 |
| 5,737,734 * | 4/1998 | Schultz ..................................... 707/5 |
| 5,913,208 * | 6/1999 | Brown et al. ............................. 707/3 |
| 5,950,189 * | 9/1999 | Cohen et al. ............................. 707/3 |
| 5,982,369 * | 11/1999 | Sciammarela et al. ............... 345/349 |

* cited by examiner

Primary Examiner—Thomas G. Black
Assistant Examiner—Thuy Do
(74) Attorney, Agent, or Firm—Oliff & Berridge, PLC

(57) ABSTRACT

Methods for knowledge management which may be performed within a data processing system. In one method, documents held in a database are displayed. Usage information relating to each document in the database is accumulated, a usage score is determined based on that information and a relevance value is assigned. The relevance value is then used to sort the documents and a list is presented to the user. Preferably, knowledge related concepts are defined and a profile representing a knowledge requirement of the user is established. A profile score may then be calculated and included in the relevance value. A user score, based on a subjective assessment of the document, may also be included in the relevance value.

14 Claims, 31 Drawing Sheets

METHODS AND SYSTEMS FOR KNOWLEDGE MANAGEMENT

TECHNICAL FIELD

This invention relates generally to the field of information technology and more particularly to knowledge management. The invention concerns methods and systems whereby users of a database system can be informed of relevant information (including text, graphics, and other information stored in electronic form) and be assisted in the transformation of such information into knowledge.

BACKGROUND OF THE INVENTION

Having passed through the agricultural and industrial revolutions, it is now widely accepted that society has entered a new era, the information revolution. Driven by the development of the microprocessor, this new era is characterized by high growth in service industries, globalisation, and rapid change brought about by constant technological innovation.

It is estimated that tangible assets (capital, buildings etc.) may now account for as little as 10% of an organization's total assets, with the balance attributed to intellectual assets such as knowledge, experience, and people.

Few large corporations live even half as long as a person. By 1983, one third of Fortune 500 companies from 1970 had vanished. There is abundant evidence that many were unable to recognize impending threats, identify the implications, or develop responses. Keeping ahead of competition requires the creation of an external focus along with a capacity to adapt quickly to a changing environment.

Rather than deliver the paperless office, the information revolution has been responsible for many companies drowning in a sea of data at the same time as being starved of knowledge. This is known as "Analysis Paralysis".

Too much information can be both expensive and difficult to manage. Important information can be easily missed. Too little information can see important opportunities missed, or decisions made based upon incomplete or invalid assumptions.

In the present context, "knowledge" may be defined as "information made actionable". In other words, knowledge is created from information when the experience and skills of a reader are applied in assessing the content of the information in the light of a particular problem or issue, thereby allowing action to be taken. Knowledge is thus a combination of information and the expertise of the reader in interpreting and applying that information.

A "knowledge worker" is a person who works with information. Most knowledge workers have other defined responsibilities in an organisation, in management, marketing, design, etc. It is the role of the knowledge worker to transform available information into the knowledge needed to make business decisions by using his/her experience and skills to interpret and analyse the information, often consulting with others, before delivering a final judgement.

This process of knowledge creation leads to an increase in the organization's intellectual assets. Sadly, however, such knowledge is often left in the head of the creator where it cannot be easily shared and is easily lost. Interest in capturing this important strategic resource has given rise to a new field of science known as "knowledge management".

In the present context, the term "knowledge management" is intended to include the processes involved in collecting information and knowledge, creating new knowledge from that material and disseminating that knowledge.

A general objective of the present invention is thus to provide methods and systems for facilitating knowledge management within organizations.

SUMMARY OF THE INVENTION

The present invention provides methods for knowledge management which may be performed within a data processing system.

The methods of the present invention may include several distinct phases which may be implemented in various combinations. The methods may include a profiling phase, including the steps of:

establishing and storing a plurality of knowledge related concepts representing a corresponding plurality of subjects, each concept being defined by a set of associated terms which are searchable within documents held in a database; and establishing and storing a knowledge related profile representing a knowledge requirement associated with the user, the profile being defined by a group of concepts selected from said plurality of concepts.

The presence in a document of terms associated with a concept suggests that the document may be relevant to the concept. The greater the proportion of the set of associated terms which are located in the document, the higher the probable relevance of the document to the concept.

If a concept is included in the group of selected concepts which define the knowledge profile of the user, this suggests that the document may be relevant to the knowledge requirement of the user. The greater the proportion of the group of selected concepts which are covered by the document, the higher the probable relevance of the document to the knowledge requirement of the user.

Each concept may be associated with one or more dimensions indicating the context in which the concept is typically applied by the user. For example, dimensions may include: companies/organizations, industries, products, locations, topics, time periods, people and miscellaneous. In this way, the knowledge profile for the user may include concepts associated with a number of dimensions. The greater the proportion of those dimensions covered by a document, the higher the probable relevance of the document to the profile and hence to the user requirement. Associating concepts with dimensions may also allow the user to group or sort documents according to those dimensions.

The profiling phase may include the optional steps of a user specifying locations within documents (such as, for example, the title, abstract and/or body) to be searched for terms associated with each concept, and storing the locations as part of the respective concept definition.

Advantageously the profiling phase may allow a user to create a knowledge concept which is a derivative of an existing knowledge concept. The derivative may be a modified version of the existing concept and may be marked as a private concept belonging to the user.

The profiling phase may allow a user to create a knowledge profile which is a derivative of an existing knowledge profile. The derivative may be a modified version of the existing profile and may be marked as a private profile belonging to the user.

Each knowledge profile may be defined by groups of concepts to be used in distinct ways. In one embodiment:

identifier concepts are used to locate relevant documents;

modifier concepts are used to attach increased importance to documents;

classifier concepts are used to sort or categorize documents; and negator concepts are used to exclude documents.

A subset of, or superset including, these concept groups may alternatively be used.

In one embodiment the step of establishing a knowledge profile may allow a user to:

specify a minimum number of concepts which must be present;

select specific concepts that must be present;

nominate a minimum value that must be reached;

specify a minimum number of dimensions to be present; and/or select specific dimensions that must be present, in a document for it to be considered a match.

Further, the step of establishing a knowledge profile preferably allows the user to nominate specific source databases of information from which documents are to be extracted. More preferably, the user may nominate a subset of available information sources.

Further still, the step of establishing a knowledge profile may allow the user to specify criteria by which priority documents are separated from other documents.

The methods of the present invention may include an extraction phase. The extraction phase may be used to extract material from the internet or from other electronic sources, via the engagement of search engines.

The extraction phase may include the steps of:

forming a query string for a knowledge profile as a logical expression of concepts selected during the profiling phase;

converting the query string into a text string containing the set of associated terms for each concept;

submitting the text string to a search engine to retrieve from a source database documents which contain said terms in the manner specified in the query string; and storing the retrieved documents in a destination database, such as an information bank.

The methods of the present invention may include a cataloguing phase for cataloguing documents held within a database, such as an information bank, so as to identify knowledge concepts present within the documents. The cataloguing phase may include the steps of:

searching the documents within the information bank for terms associated with each knowledge concept; and storing in each document a name for each concept associated with each of said terms located in the document.

Preferably the concept names stored in the document are grouped according to the dimensions in which each concept is associated.

A search score indicating the relevance of a document may be determined for each concept present in the document and may be stored with the name of the concept in the document. The search score for a concept may be based on the proportion of the set of associated terms which are located in the document.

The methods of the present invention may include a valuation phase. The valuation phase may be used for computing a relevance value for each document in respect of each knowledge profile.

The valuation phase may calculate the relevance value of a document for a knowledge profile based on:

a profile score indicating how well the document matches the knowledge profile;

a usage score derived from document usage statistics; and/or a user score, being a subjective assessment of the relevance of the document.

The relevance value may be used for determining a retention period for each document. The document may be removed at the expiry of the retention period.

The profile score for a knowledge profile may be calculated based on the proportion of concepts and/or the proportion of dimensions contained in the knowledge profile which are present in the document. The profile name and profile score may then be saved back in the document.

The methods of the present invention may include a delivery phase. The delivery phase may be used for delivering relevant documents to the user from a database, such as an information bank. One form of the delivery phase may include delivering documents from an information bank to a knowledge base for the user.

A knowledge base may be created as a repository to hold the information/knowledge requirements for a group of one or more users. A corresponding group of knowledge profiles are therefore used by the knowledge base.

Copies of documents relevant to a profile used by the knowledge base may be posted to the knowledge base after having been modified to remove catalogue entries, containing knowledge concept and profiles, not relevant to knowledge requirements of the user(s) of the knowledge base.

The methods of the present invention may include an interaction phase. The interaction phase may facilitate and promote discussion and interaction between users of a knowledge base.

The interaction phase may include a component for displaying to a user the contents of the knowledge base. Preferably the user is given an option to select knowledge profiles from those used by the knowledge base so as to display only those documents relevant to the selected knowledge profile(s).

The interaction phase may include respective components for creating, collecting and disseminating discussion forums. These components may allow a user to create a comment document related to one or more base documents and to link the former to the latter. Responses by other users to the comments may then also be linked, thereby forming a chain of linked documents constituting a discussion. The discussion documents may be distributed automatically to users making use of the base document.

The interaction phase may include gathering statistics about usage of a document (such as reading and adding of comments), and store the usage statistics within the document. The name of the user using the document (eg. reading or commenting) may also be stored.

The profiling phase may allow a user to assign a weighting to each type of usage of a document. The valuation phase may then include a step of establishing a usage score based on the usage weightings and the usage statistics. The relevance value may be computed as a function of the usage score. Preferably the relevance values are continually revised based on usage of each document.

The methods of the present invention may include an analysis/summary phase. The analysis/summary phase may allow a user to highlight text within a document and to automatically copy that text to a summary document. The summary document may include a plurality of sections and the user may be given an option to select which section the text is to be copied to. Advantageously an electronic link back to the original document may be stored with the text in the summary document.

The analysis/summary phase may enable a user to manually write an analysis document based on existing documents and to electronically link the analysis document to the existing documents.

The analysis/summary phase may facilitate creation of new knowledge from base information/knowledge by enabling users to apply their experience and skill in assessing and interpreting the base information/knowledge. Such knowledge may then be retained as an asset for use by an organization as a whole.

The methods of the present invention may include an adaptive learning phase. The adaptive learning phase may allow existing knowledge concept definitions to be refined by the addition of new terms frequently located in documents of high relevance or the removal of infrequently located terms.

In one aspect the present invention provides a method of displaying documents held in a database, including the steps of:

- accumulating usage information relating to each document in the database;
- determining a usage score for each document based on the usage information;
- assigning a relevance value to each document based at least in part on the usage score;
- storing the relevance value with the respective document;
- sorting the documents according to their relevance values; and
- displaying to a user of the database a list of at least a portion of the sorted documents.

In another aspect the present invention may provide an integrated method for collecting, creating and disseminating knowledge within and between organizations. Such an integrated method may include the profiling, extraction, cataloguing, valuation, delivery, interaction, analysis/summary and adaptive learning phases described above. This integrated method may bring together information and knowledge held in electronic form and may facilitate the capture of additional information through human inputs, before storing the resultant knowledge for use by others within the organization(s) as a collection of electronic knowledge bases.

In a further aspect, the present invention may provide a method for drawing relevant information from a wide range of sources (both internal and external to the organisation). In one embodiment, such a method may include components from the profiling and extraction phases described above. Other embodiments of the invention may include components from the cataloguing, valuation, delivery and/or adaptive learning phases. Still further embodiments of the invention may include components from the interaction and analysis/summary phases.

In a further aspect, the present invention may provide a method for facilitating the transformation of information into knowledge. In one embodiment, such a method may include components from the interaction and summary/analysis phases described above. Other embodiments may include components from various others of the above described phases.

In a further aspect, the present invention may provide a method for disseminating information and/or knowledge. In one embodiment, such a method includes components from the interaction phase described above. Other embodiments may include components from the delivery phase and/or from the various other phases described above.

The present invention may also provide systems for implementing the above described methods for knowledge management.

By incorporating various phases of the knowledge management method of the invention users may be provided with an increasingly relevant set of base material that matches specified knowledge requirements. This information/knowledge may then used to generate new knowledge which may be retained within the system for use as base material by others.

The methods and systems of the invention may thus assist an organisation to recognise impending threats, identify the implications and develop suitable responses based on the collective skills and experience of its people.

BRIEF DESCRIPTION OF THE DRAWINGS

A preferred embodiment of the invention will now be described, by way of example only, with reference to the accompanying drawings in which.

DESCRIPTION OF PREFERRED EMBODIMENTS

Figure 1:
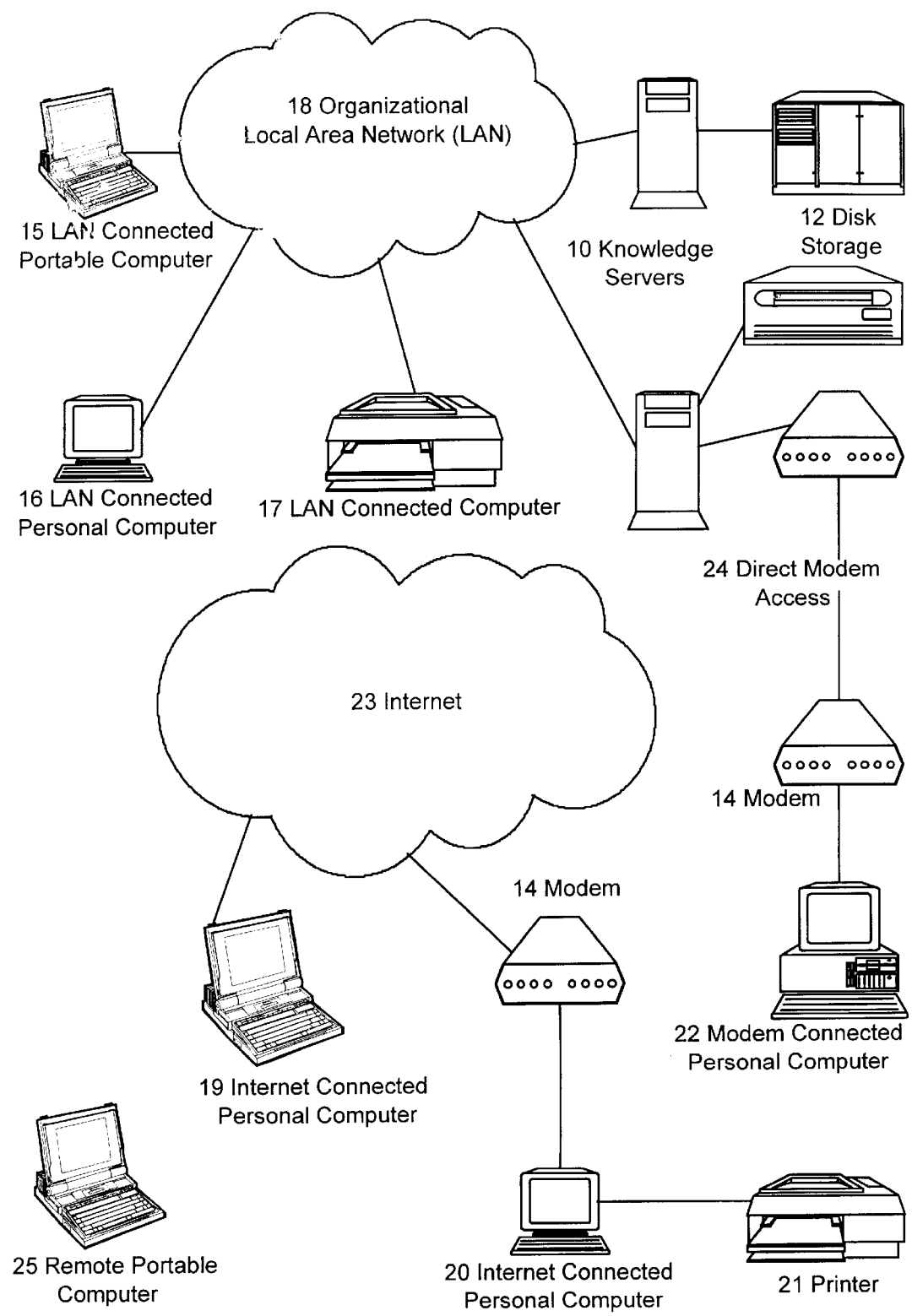
FIG. 1 is a schematic diagram illustrating an exemplary computer system for use with the invention.

A preferred embodiment of the knowledge management system of the invention may be implemented using a computer system in the form of a network as represented in FIG. 1. The computer network includes one or more computers dedicated to the task of knowledge servers 10 and one or more workstations 15,16,19, 20, 22, 25.

The computers designated to the task of knowledge servers 10 may be personal computers or may take the form of other computers, such as minicomputers or mainframes, as required to complete the tasks allocated. These knowledge servers 10 preferably have access to a range of external information sources such as a mainframe computer 13, or the internet 23.

User access to the knowledge management system may be in the form of personal computers 16, 20, 22, portable computers 15, 19, 25 or other forms of workstation (not shown), which are able to access one or more of the knowledge servers 10 by electronic communications such as Local Area Network 18, Direct Modem Access 24 or Internet Access 23. Other communication methods may also be possibe. Once sufficient information is stored on a hard disk, or other mass storage means, of a personal or portable computer, that computer may then be operated in isolation as a remote computer 25 for a period of time.

The knowledge management system of the invention may be implemented by a software package executed by the computer network shown in FIG. 1. The software may be designed as an integrated program, or broken into a number of discrete modules. A number of these modules may run on the knowledge servers 10 only, whilst other modules may be designed to be executed on user workstations 15, 16, 19, 20, 22, 25. It is also possible to combine the functions of a knowledge server and a user workstation on a single personal computer.

Figure 2:
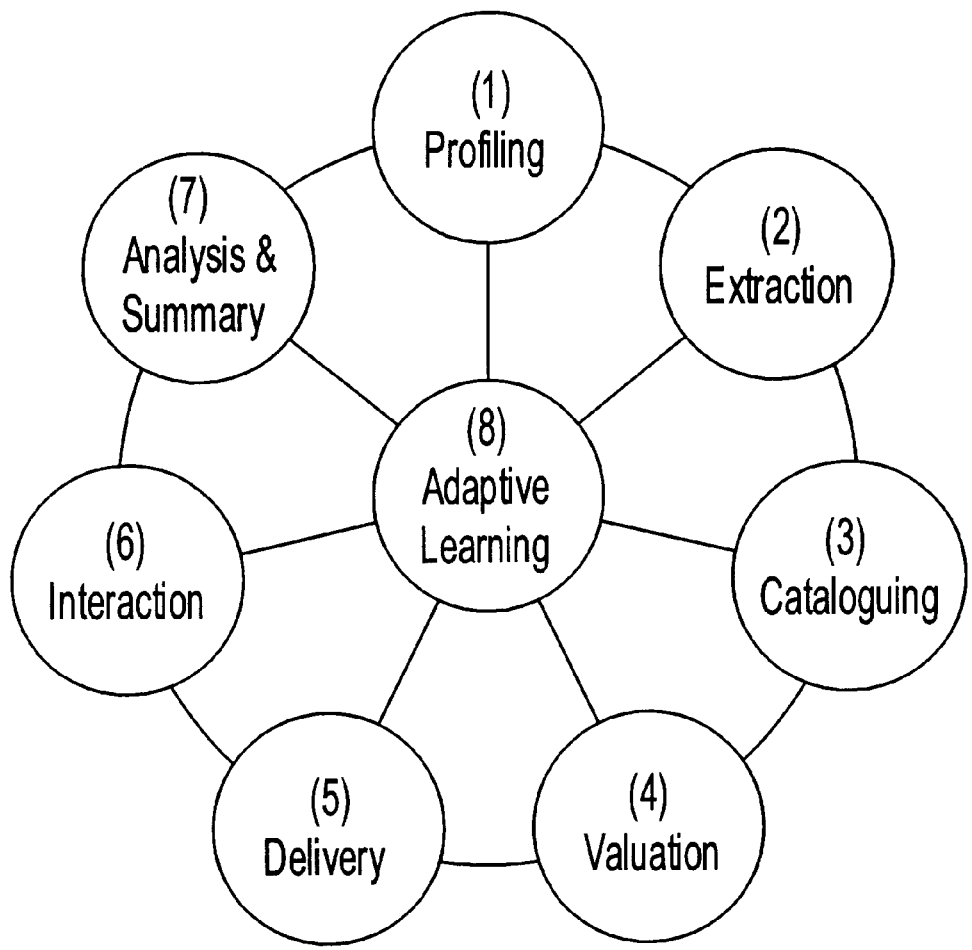
FIG. 2 is a functional block diagram giving an overview of an eight phase knowledge management process according to a preferred embodiment of the invention.

A complete software package implementing a preferred embodiment of the knowledge management process of the invention may include eight phases:

1) Profiling
2) Extraction
3) Cataloguing
4) Valuation
5) Delivery
6) Interaction
7) Analaysis & Summary
8) Adaptive Learning A functional block diagram of these eight phases is depicted in FIG. 2. It should be understood, however, that not all phases are essential to the working of the invention. Similarly, not all components of those phases, as shown in the remaining figures and described in detail below, are essential to the invention.

(1) Profiling Phase

Figure 3:
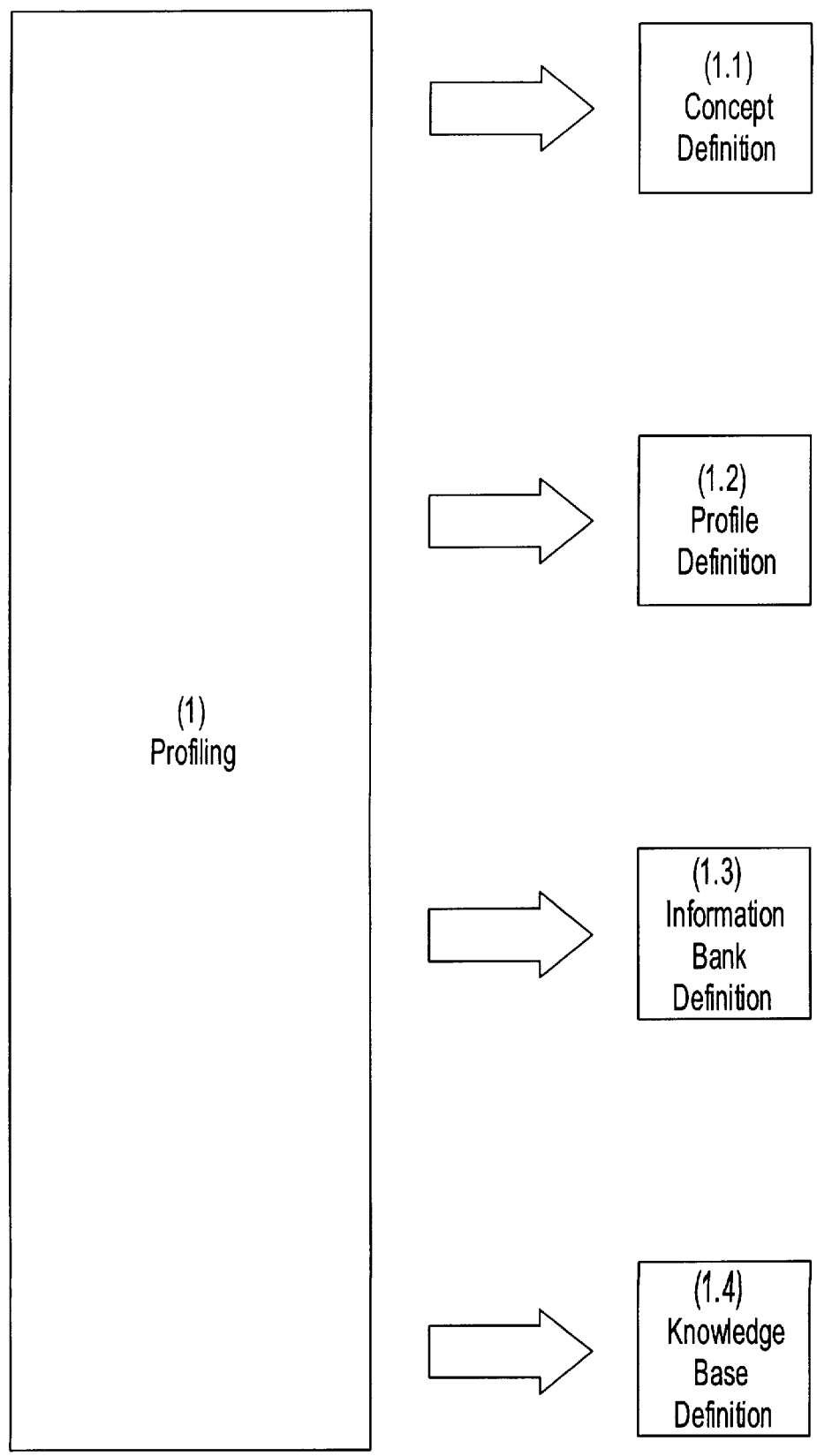
FIG. 3 is a functional block diagram showing key components of a preferred embodiment of the profiling phase shown in FIG. 2.

The profiling phase enables the establishment of knowledge definitions key to supporting the preferred knowledge management process. As outlined in FIG. 3, a preferred embodiment of the profiling phase may include four components, being: concept definition (1.1), profile definition (1.2), information bank definition (1.3), and knowledge base definition (1.4).

(1.1) Concept Definition

A key aspect of a preferred embodiment of the system is the creation of knowledge concepts. Knowledge concepts are the basic building blocks around which the knowledge management system constructs its understanding of the knowledge requirements of a user. The user may be an individual knowledge worker, a group of workers or an organization as a whole. A concept may be defined by a discrete set of terms (words or phrases) or by logical expressions of terms. Multiple expressions may be used to allow for differing search syntax applicable to a number of search engines.

Each concept is preferably associated with one or more concept types, known as dimensions, that indicate the context in which the concept is typically applied by the user. Dimensions may include concept types such as, for example, companies/organizations, industries, products, locations, topics, time, people and miscellaneous.

Figure 4:
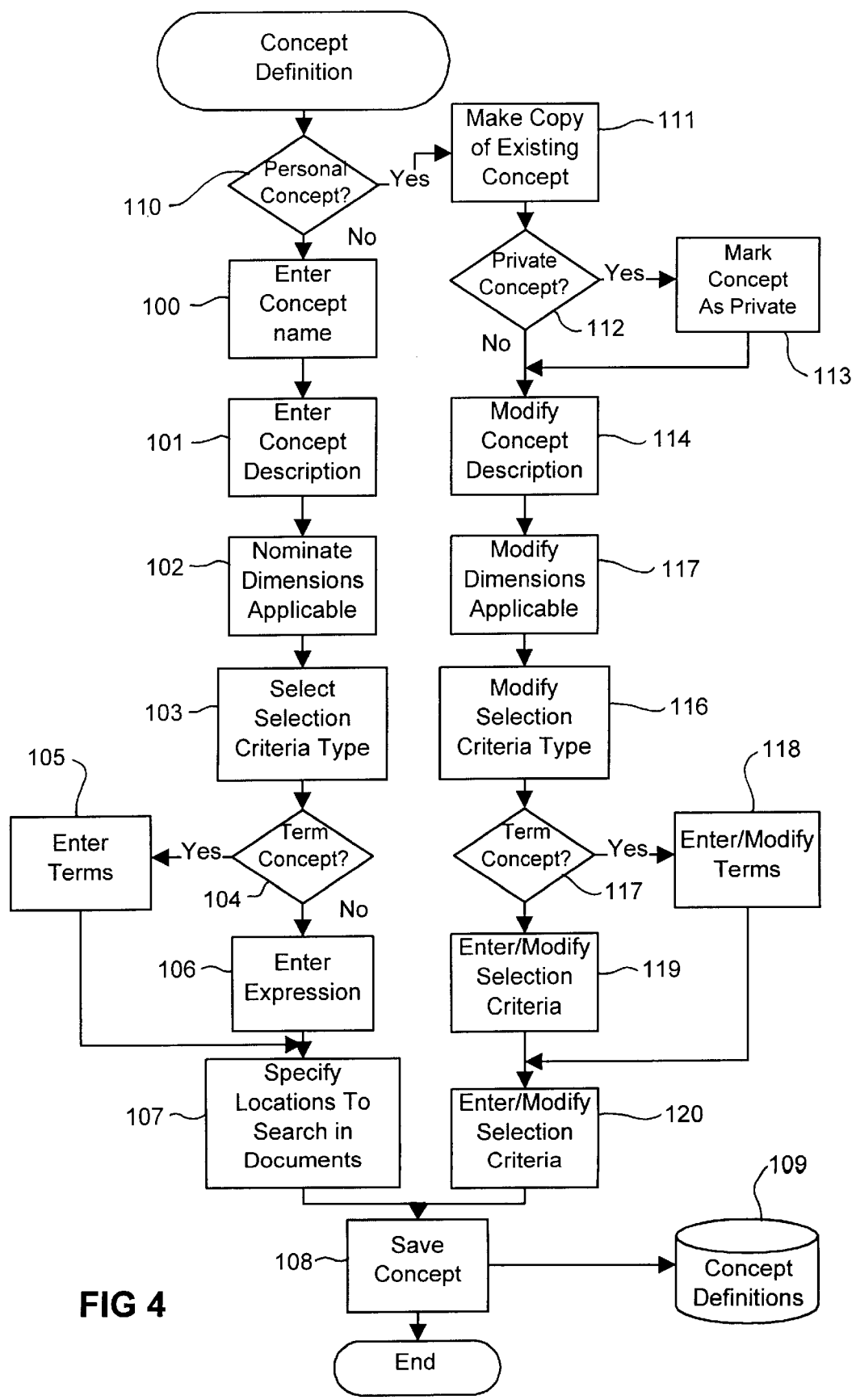
FIG. 4 is a flowchart illustrating the concept definition component of FIG. 3.

A preferred embodiment of a process and system to define a knowledge concept is outlined in the flowchart shown in FIG. 4. A user is required to enter a name for the concept 100, a description of the concept 101, and a list of one or more dimensions to which the concept applies 102. The user then designates the type of selection criteria 103 by which the concept is to be defined. If the concept is to be defined by terms 104, such as words or phrases, a list of one or more terms is entered 105. If the concept is to be defined by expressions, a series of terms forming a logical expression is entered 106 using syntax valid to each relevant search engine being employed by the system. The user then has the option 107 of specifying particular locations within a document to be searched, such as title, abstract, and/or body, for the applicable terms before the knowledge concept is saved 108 in a concept definitions database 109.

A user may be given an option 110 take a personal copy 111 of an existing knowledge concept, amending 114–120 those parameters already entered. An additional option 112 may be provided to mark the concept as private 113, therefore requesting that the presence of this concept not be flagged to anybody else.

One example of a concept definition is as follows:

| | |
|---|---|
| Concept Name: | Coles Myer |
| Concept Description: | Coles Myer, Australia's largest retailer |
| Relevant Dimensions: | Company\Organisation |
| Defined Using: | Terms |
| Concept Terms: | Coles Myer |
| | Kmart |
| | Kmart |
| | Fosseys |
| | Coles |
| | Myer |
| | Grace. Bros. |
| | Bi-Lo |

-continued

| Search Locations: | Liquorland |
| --- | --- |
| | Title |
| | Abstract |
| | Body |

Notes:

The presence of any of the concept terms in the title, abstract, or body of a document indicates that the document is likely to relate to the user's definition of the concept Coles Myer. The greater the number of these terms found, the higher the likely relevance, and hence the higher the search score that should be stored during the cataloguing phase (See components 3.1 and 3.2).

(1.2) Knowledge Profile Definition

Knowledge Profiles define knowledge requirements of users and are built up from knowledge concepts (defined in component 1.1). Preferably each profile definition is specified according to several groups of concepts, to be used in distinct ways. Preferably four groups of concepts are specified, being identifiers, modifiers, classifiers and negators, and are used in one of four distinct ways:
(i) Identifiers are concepts whose presence in material indicates such material is likely to be relevant to the defined need.
(ii) Modifiers are concepts whose presence in material does not in itself indicate such material is relevant, but the presence of these concepts would suggest the material is likely to be of increased value.
(iii) Classifiers are concepts that can be used subsequently to sort or classify the material but do not infer relevance or increased value.
(iv) Negators are concepts whose presence indicates the material is not relevant to the particular need.

In defining a knowledge profile a range of parameters may also be collected to:
    identify potential sources of information,
    define priority material to be separated from the rest, and
    define other special criteria to determine which material is to be selected.

Figure 5A:
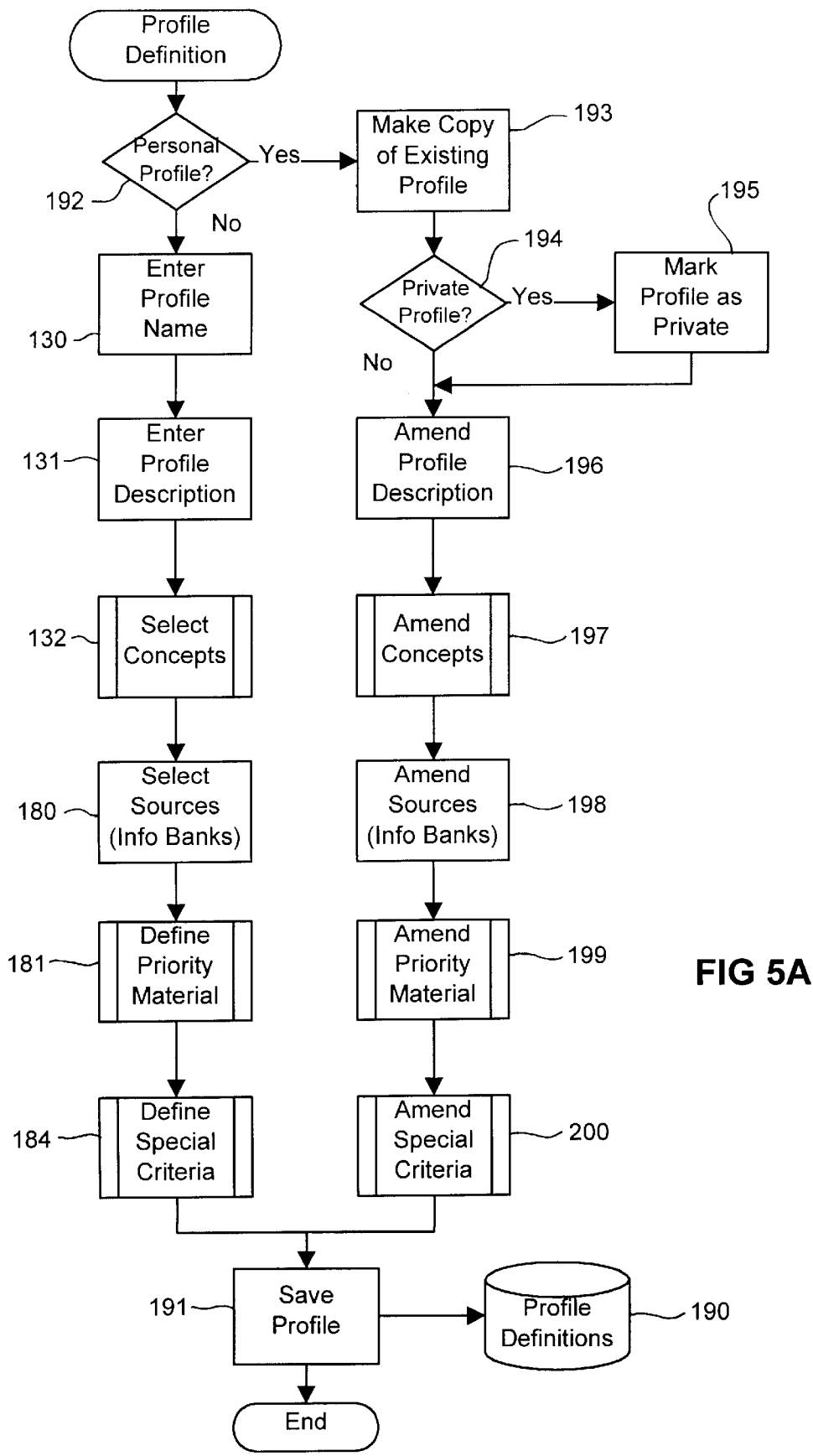
FIGS. 5a to 5c, taken together, is a flowchart illustrating the profile definition component of FIG. 3.
Figure 5B:
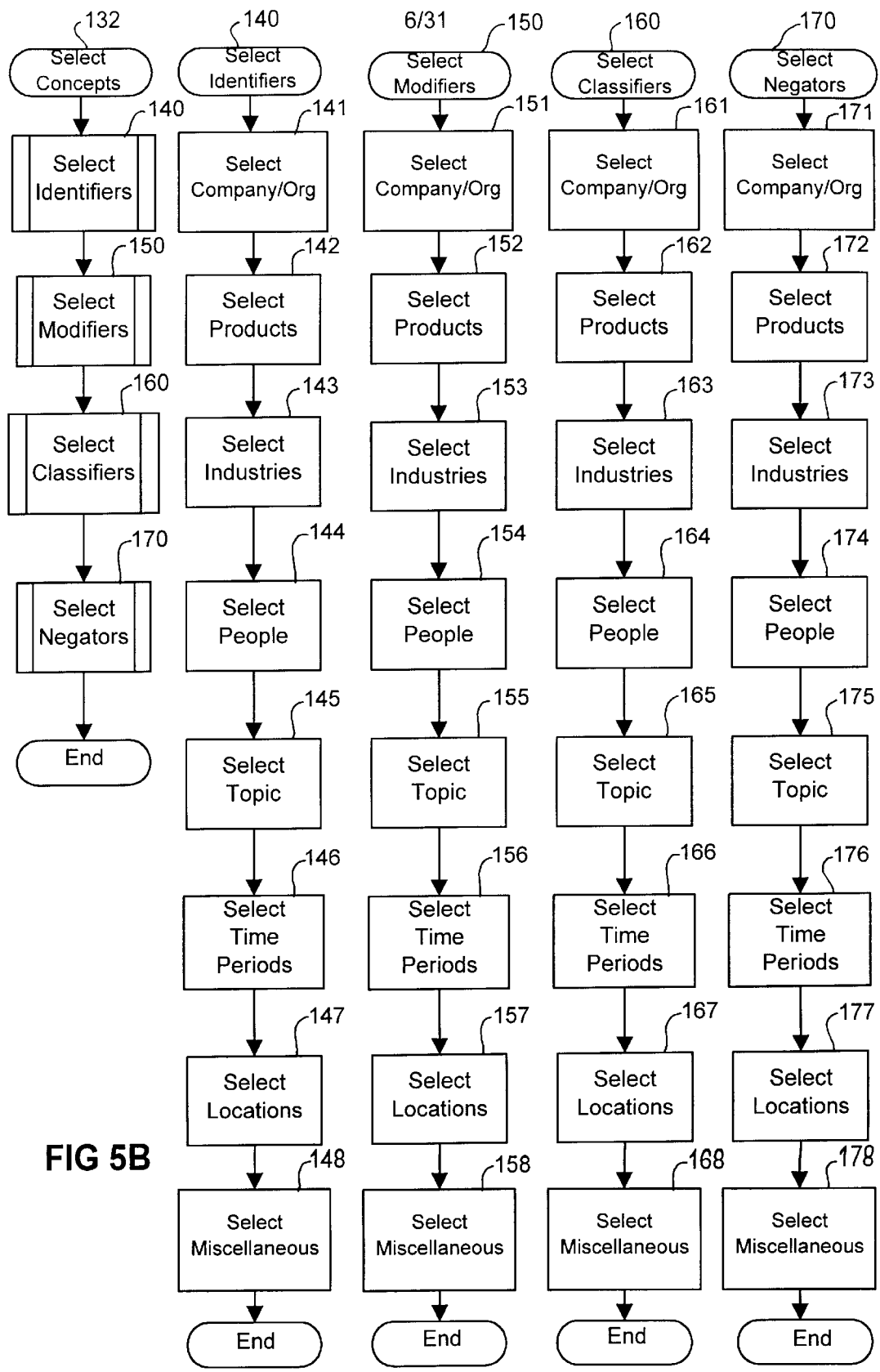
Figure 5C:
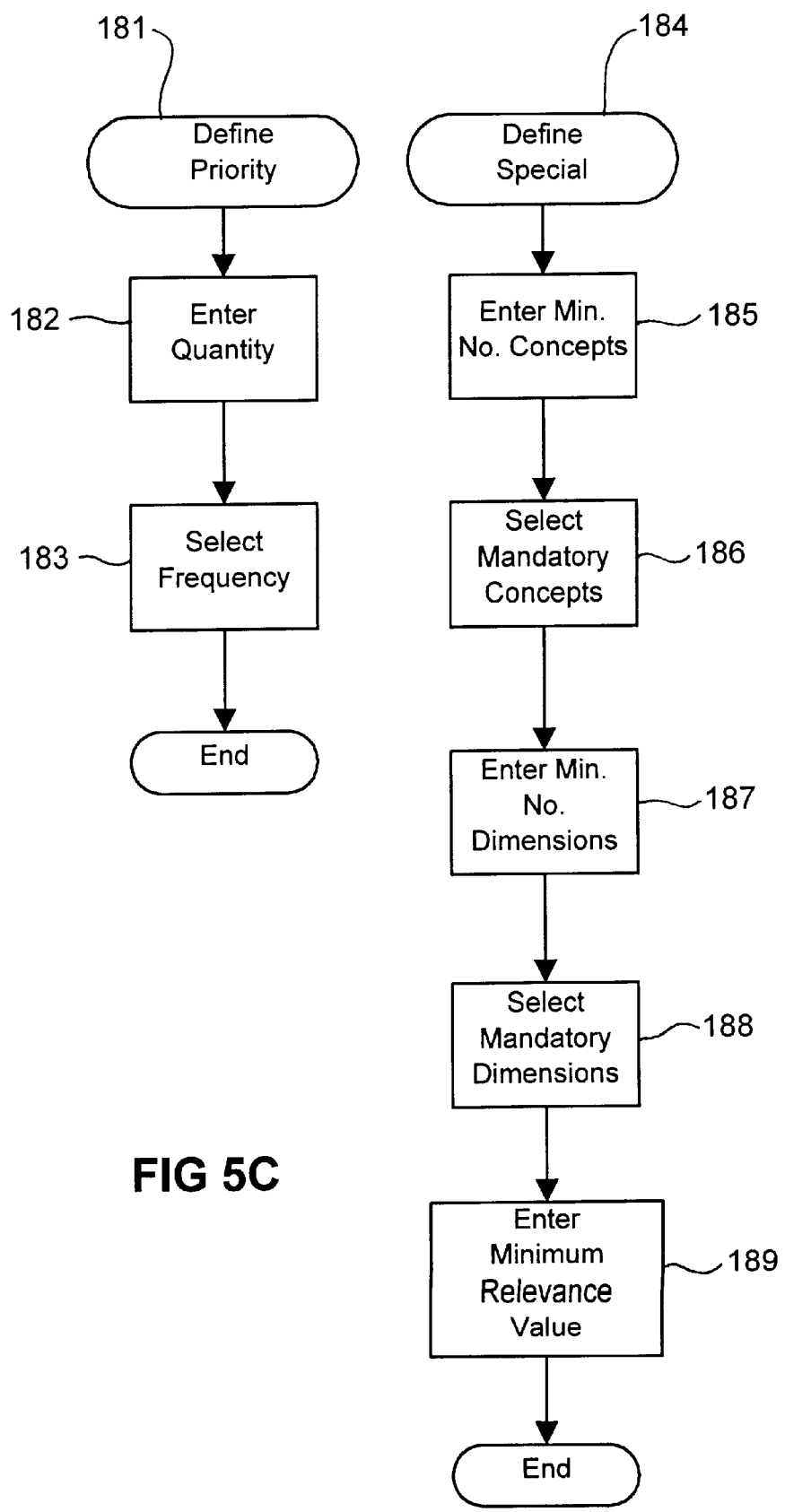

A preferred embodiment of a process to define a knowledge profile is outlined in FIGS. 5A–5C. A user is requested to assign a name 130 to the profile along with a description 131. The user would then be required to select concepts 132 to be used as identifiers 140, modifiers 150, classifiers 160, and negators 170. For each of these four concept groups 140, 150, 160, 170 the user is prompted to select concepts by dimensions (companies/organizations, products, industries, people, topics, time periods, locations, miscellaneous 141–148, 151–158, 161–168, 171–178 respectively) from a list of concepts already defined (See component 1.1 and FIG. 4) as relating to each dimension.

The user may then select potential sources of material 180 from a list of information banks (see component 1.3 below).

The next step may be to define criteria by which priority material 181 is separated from the rest. This may be done by entering a quantity of documents 182 and the frequency 183 (e.g. day, week, month) of those documents with the highest values in the nominated period to be identified as being of particular relevance.

The final step before saving 191 the knowledge profile, in a profile definition database 190, may involve defining special criteria 184 for selecting material as relevant. The user may enter a minimum number of concepts 185 or dimensions 187 that must be matched, a minimum value that must be reached 189 or select specificly required (ie. mandatory) concepts 186 or dimensions 188 which must be present in a document for it to be deemed relevant.

A user may be given an option 192 to take a personal copy 193 of an existing knowledge profile, amending 196–200 those parameters already entered. An additional option 194 may be provided to mark 195 the profile as private, therefore requesting that the presence of this profile not be flagged to anybody else.

One example of a knowledge profile definition is as follows:
Profile Name: Australian Virtual Banking Industry
Profile Description: Commentary about the four major banks and initiatives being undertaken in the electronic banking arena.
Concepts:

| | Identifiers | Modifiers | Classifiers | Negators |
| --- | --- | --- | --- | --- |
| Company/Org. | | NAB | IBM | |
| | | Westpac | Digital | |
| | | CBA | Advance Bank | |
| | | ANZ | St George Bank | |
| Products | | | Home Loans | Quicklink |
| | | | Insurance | |
| Industries | | | Banking | |
| People | | | | Don Argus |
| Topics | Internet Banking | | | |
| | Kiosk Banking | | | |
| | Virtual Banking | | | |
| Time Periods | | | | |
| Locations | Australia | | | |
| Miscellaneous | | | | |

Priority Material: Top 5 Articles Each Week
Mandatory Dimensions: Topics, Locations
Notes:
Concept Groups (columns of above table):
    Identifiers: The presence of material that mentions Australia and one or more of the topics Internet Banking, Kiosk Banking, or Virtual Banking indicates the material may be relevant to this knowledge profile. The greater the number of identifier concepts found, the higher the likely relevance (and hence value).
    Modifiers: The presence of any of the modifier concepts does not in itself indicate the material is relevant but the presence of these concepts increases the potential value of the material.
    Classifiers: When reviewing material the user in this example would like to see the material grouped under these headings as well as those specified as identifiers or modifiers.
    Negators: Material about Quicklink is of no value and should be excluded.
Dimensions (rows of above table):
    In valuing material it is deemed that a document covering Westpac, Home Loans, Internet Banking, and Australia (i.e. 4 concepts and 4 dimensions) is more relevant that another document covering Internet Banking, Virtual Banking, Kiosk Banking, Australia (i.e. 4 concepts and 2 dimensions) by virtue of the greater proportion of relevant dimensions covered.
    In reviewing material a user may wish to see articles grouped by company/organisation (e.g. NAB, Westpac, etc.) and at a later stage see the material grouped by topic (e.g. internet banking, kiosk banking etc.) In doing these specific tasks, unrelated concepts (e.g. Australia, Don Argus) should not be allowed to clutter the list. This is achieved by assigning concepts to dimensions.

(1.3) Information Bank Definition

Information Banks are designed as repositories of information/knowledge material (documents) for use, typically, by an entire organisation. Preferably separate information banks are established for separate classes or sources of material. For example, one information bank may contain all information fed from a Reuters news feed, whilst another may hold internet pages.

The process of defining an information bank calls for the storage of a range of parameters that define characteristics about that information bank, such as a description and name of the physical file. It is considered that the implementation of such a process could be easily created by a person skilled in the area of computer programming and need not therefore be explained further.

(1.4) Knowledge Base Definition

Figure 14:
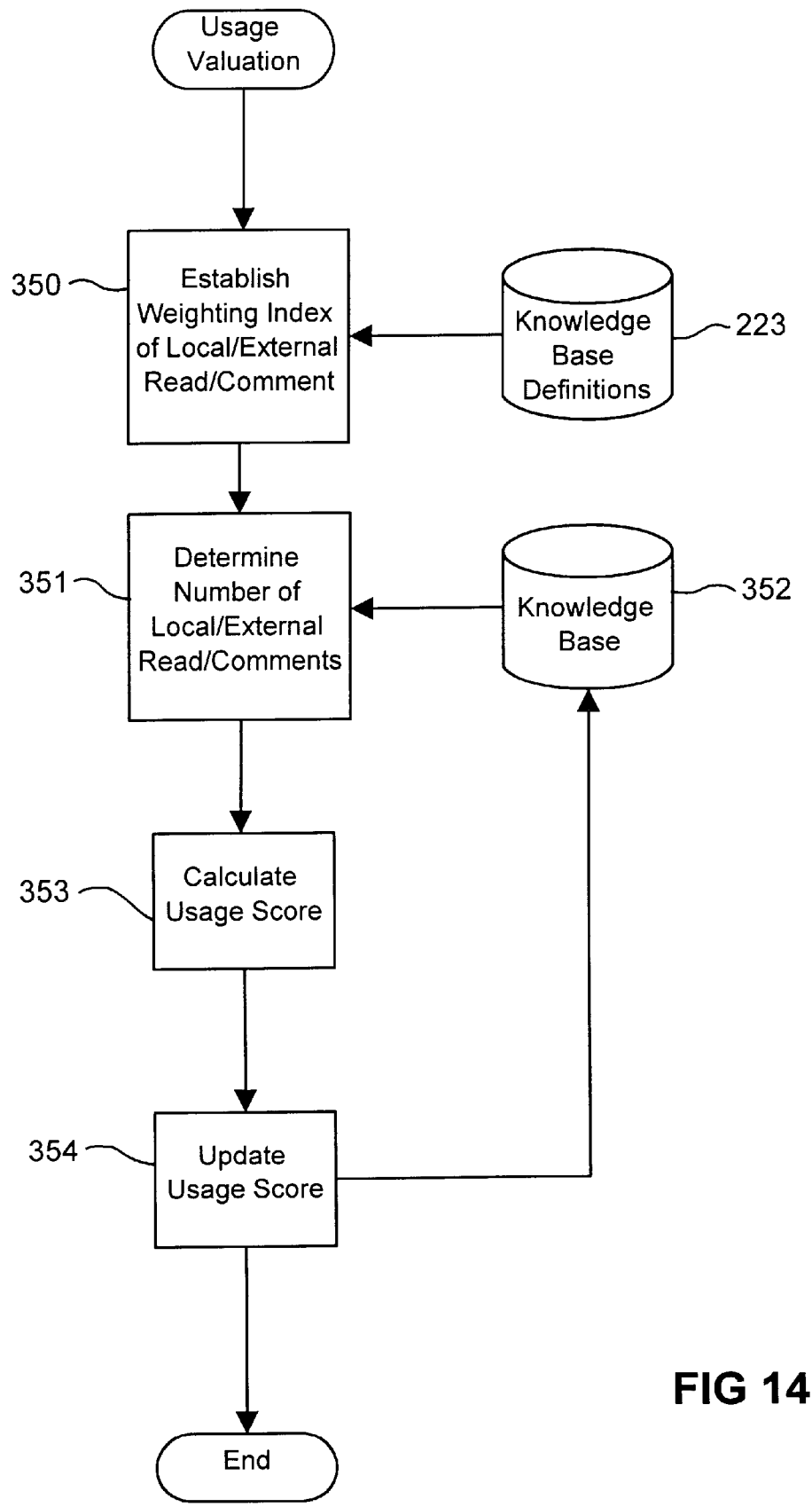
FIG. 14 is a flowchart illustrating the usage valuation component of FIG. 12.

A Knowledge Base is a repository to hold the information/knowledge requirements for a group of one or more people. In defining a knowledge base it is necessary to nominate one or more knowledge profiles to be used to populate the knowledge base. Other important parameters may include a weighting to be placed upon events such as the reading, printing, linking, e-mailing and adding of comments by users to existing documents (used in the valuation of the documents—refer component 4.2 and FIG. 14). These parameters may be applicable in terms of users of the knowledge base in question as well as users of the same document held in other knowledge bases. Retention periods for documents may be established with reference to differing periods of retention based upon the valuation of each document.

Figure 6:
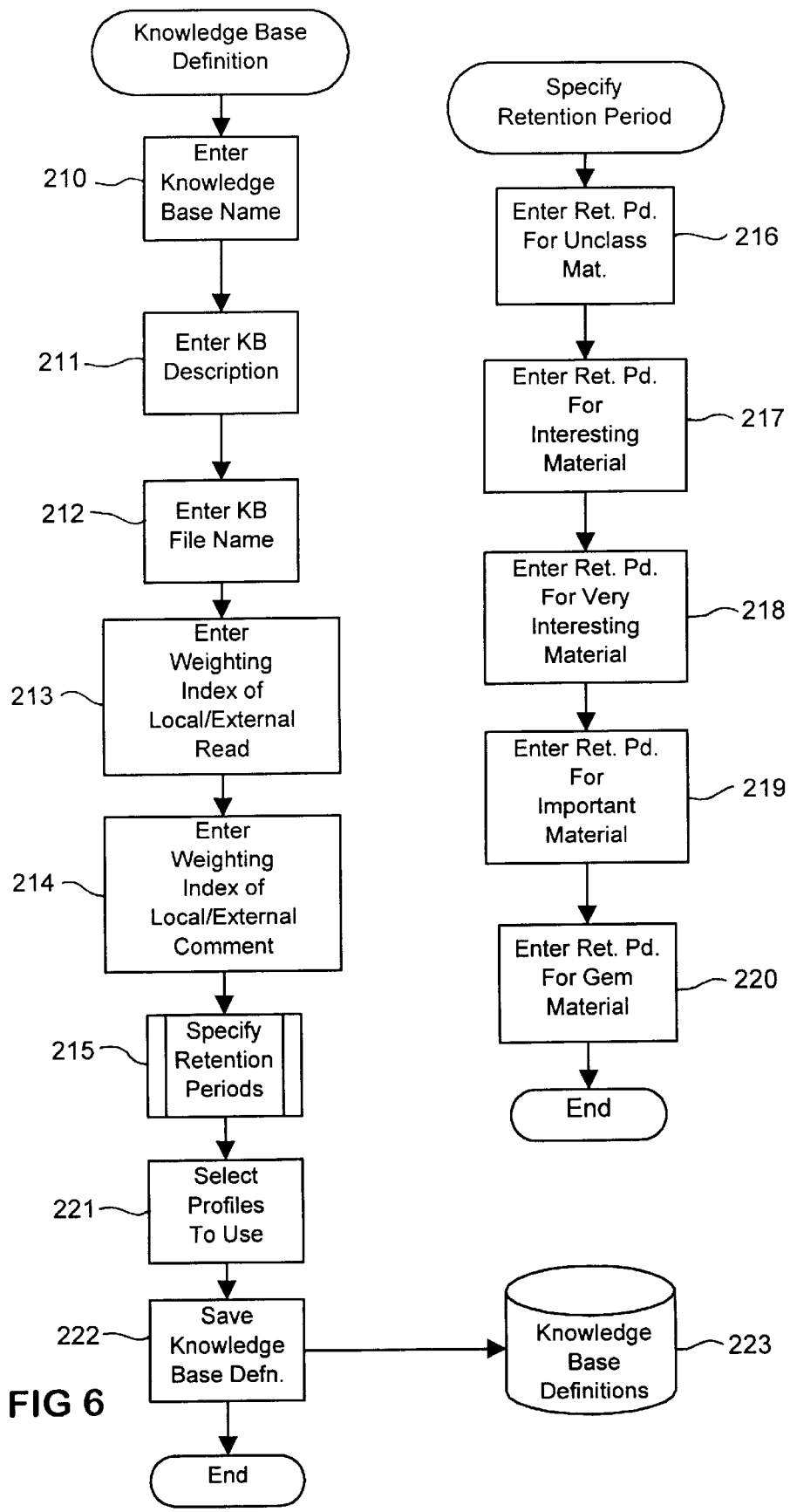
FIG. 6 is a flowchart illustrating the knowledge base definition component of FIG. 3.

A preferred embodiment of a process to define a knowledge base is outlined in FIG. 6. A user is requested to assign a name 210 to the knowledge base, a description 211, the physical file name 212 for the database, the weighting index 213 to be associated with the act of reading a document (within the knowledge base and from within other knowledge bases), and the weighting index 214 to be associated with the adding of comments to a document (within the knowledge base and from within other knowledge bases). The retention periods may be specified 215 with respect to a finite set of document value bands (e.g. unclassified 216, interesting 217, very interesting 218, important 219, gems 220). The final step involves the selection of the knowledge profiles to be used 221, drawn from the list of previously defined knowledge profiles (refer component 1.2 and FIG. 5A). The knowledge profiles are then saved 222 for later use within a knowledge base definitions database 223.

One example of a knowledge base definition is as follows:

| | |
|---|---|
| Knowledge Base Name: | Australian Banking |
| Description: | Information about the Australian Banking Industry |
| File Name: | Data/Ausbank.dat |
| Weighting of Local Read: | 100 |
| Weighting of External Read: | 25 |
| Weighting of Local Comment: | 300 |
| Weighting of External Comment: | 150 |
| Retention Periods: | Gem - 2 years |
| | Important - 6 months |
| | Very Interesting - 4 months |

-continued

| | |
|---|---|
| | Interesting - 3 months |
| | Unclassified - 3 weeks |
| Knowledge Profiles: | Australian Banks |
| | Australian Virtual Banking Industry |
| | Globalisation of Banking |

Notes:

A group of one or more users who have an interest in Australian banks, developments in virtual banking and trends towards globalisation may use a single knowledge base into which would be delivered copies of material that match the profiles selected.

Material is kept for differing periods of time based upon the prevailing value (as determined in Phase 4) assigned to each document with respect to the three specified knowledge profiles.

(2) Extraction Phase

The extraction phase involves the transfer of documents from a range of electronic sources to information banks.

Figure 7:
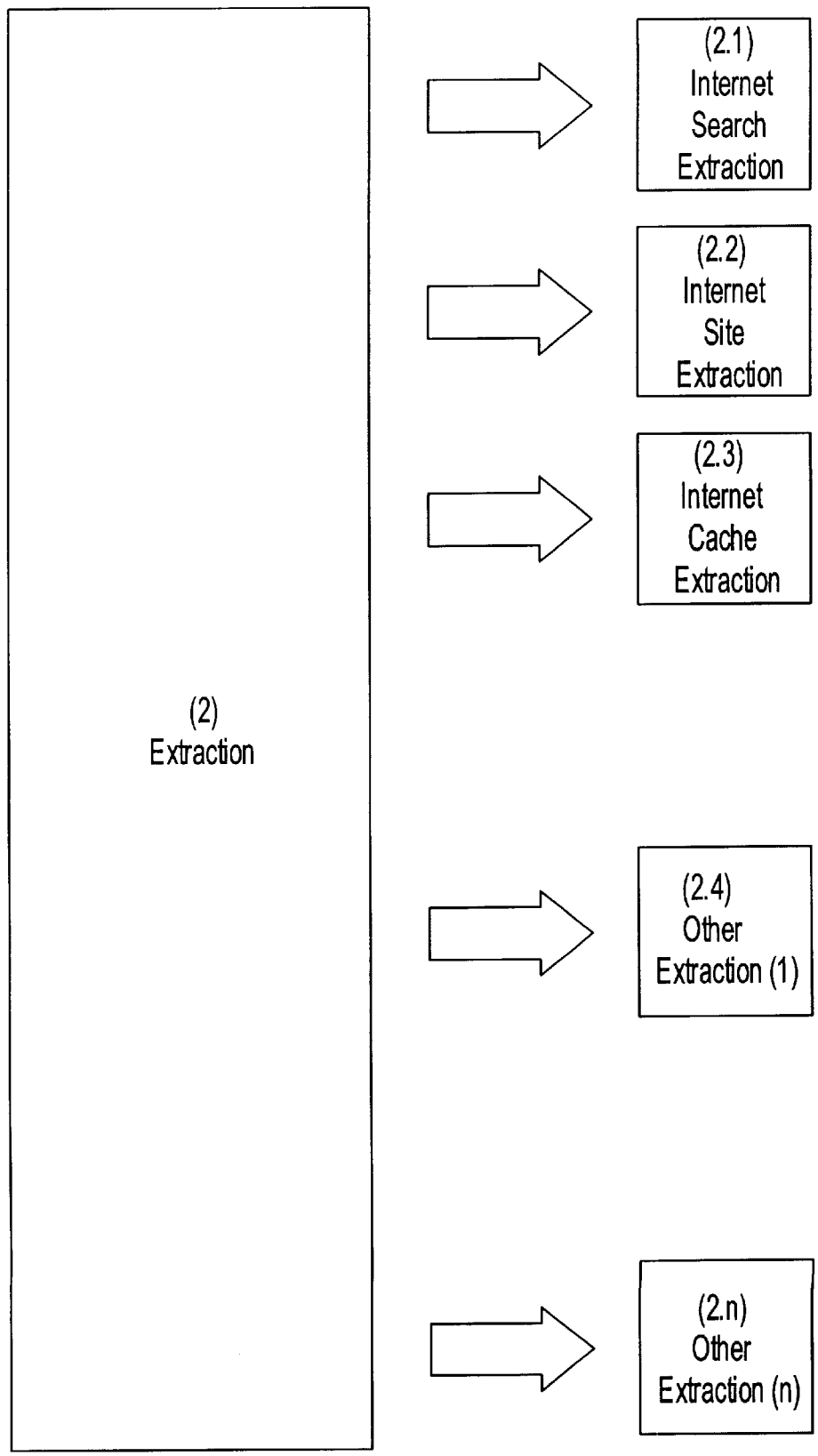
FIG. 7 is a functional block diagram showing key components of a preferred embodiment of the extraction phase shown in FIG. 2.

A preferred embodiment of the extraction phase is outlined in FIG. 7. The system may have an extraction process created for each potential source of information/knowledge considered of relevance by the user organization. Such extractions may involve pulling all the material from an electronic source or a defined subset of that material.

The techniques applicable for extracting information vary from source to source. The ability of the invention to utilize the knowledge requirements established in the profiling phase to dynamically invoke electronic searching of sources is demonstrated by way of an example of an Internet search extraction.

(2.1) Internet Search Extraction

Figure 8A:
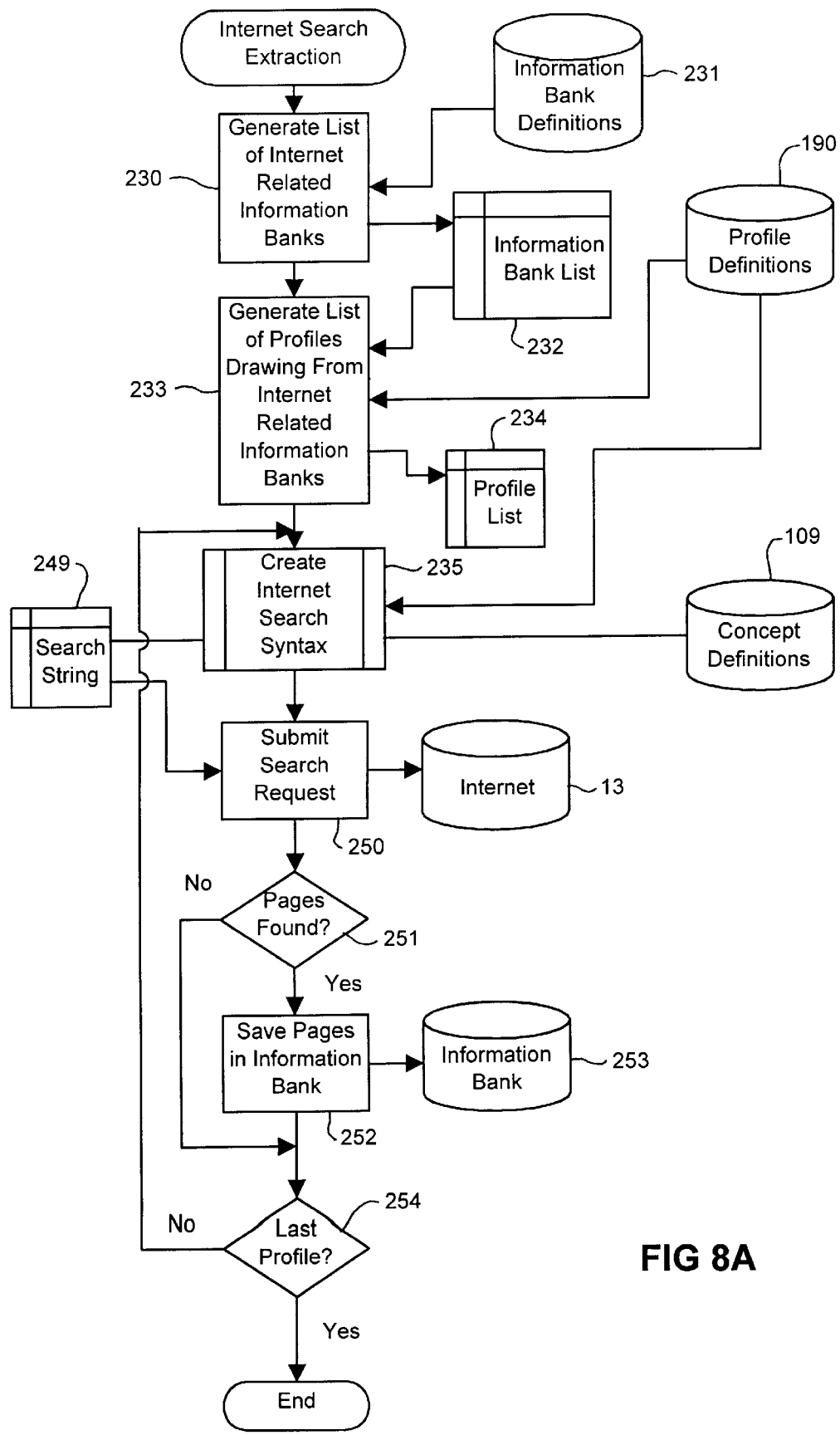
FIGS. 8a and 8b, taken together, is a flowchart illustrating the internet search extraction component of FIG. 7.
Figure 8B:
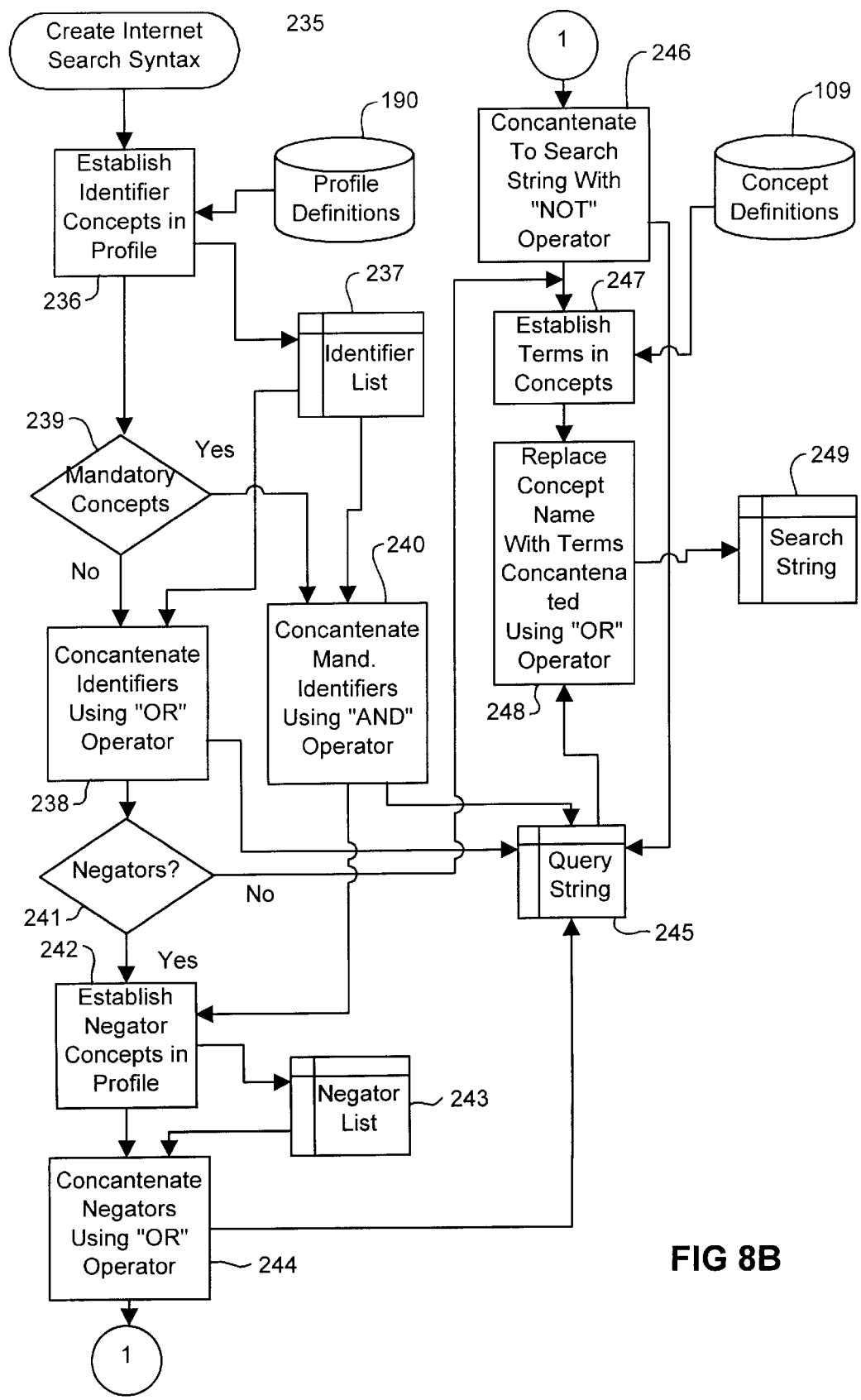

A preferred embodiment of an Internet search extraction process is outlined in FIGS. 8A and 8B, taken together. Other embodiments employing differing techniques may be used without departing from the principals of the invention.

Referring to FIGS. 8A and 8B, the process first determines 230 from information bank definitions 231 those information banks for which extraction from the Internet has been nominated (See steps 180 and 198 in FIG. 5A). These are stored as a list 232. For each information bank a separate extraction process may be executed.

A list of knowledge profiles 234 relevant to an information bank listed within the information bank list 232 is established 233, with a separate search string created 250 for each profile. A first query string is created by first taking each identifying concept 236, 237 listed in the profile 190 and concatenating them 238 using a logical "OR" operator. Alternatively, if certain concepts have been defined as mandatory 239, these alone are used in the first query string concatenated 240 using a logical "AND" operator. If negator concepts are present 241–243 these are concatenated 244 into a second query string using a logical "OR" operator. This second query string is then concatenated 246 with the first using a logical "NOT" operator, producing a first parse of the query string 245. For example, the syntax of a query string created for the knowledge profile example given in component 1.2 above would be as follows:

((Internet Banking or Kiosk Banking or Virtual Banking) AND (Australia))

AND NOT (Qucklink)

Notes:

In the profile definition, Topics (Internet Banking, etc.) and Locations (Australia) were selected as being mandatory dimensions. While the concept Quicklink was specified as a negator concept.

A second parse of the query string 245 involves replacement of the concept names with the terms 247, 248 or expressions used to define each concept 109 to produce a search string 249. The exact syntax of the resultant search string 249 would be dependent upon the Internet search engine to be used. A series of search strings 249 may be created for use on a range of Internet search engines.

Having created 235 the appropriate search syntax, the search string 249 is submitted 250 is to the relevant Internet search engine (via a communications link to the Internet 13) for execution. The resultant list of Universal Resource Locators (URLs) returned by the search engine is used to retrieve 251 the appropriate Internet pages, which are then saved 252 in the nominated Information Bank 253 for later use. Steps 235–253 are then repeated 254 for each profile associated with the information bank 253.

(2.2) Internet Site Selection

Internet site selection is a process to enable a user of the system to nominate particular internet sites (as specified by a Universal Resource Locater—URL) and the number of levels down to follow links referred to from the nominated site.

The process of extracting the relevant web pages could be easily created by a person skilled in the area of computer programming and need not therefore be explained further.

(2.3) Internet Cache Extraction

Whenever a person uses an internet browser to find (surf) information from the internet, the browser software will typically store a copy of the internet pages retrieved in a database file known as an internet cache. The purpose of an internet cache extraction process is to pull the internet pages stored in these caches into one or more information banks for use by the knowledge management system.

The process of transferring these web pages from internet caches to an information bank could be easily created by a person skilled in the area of computer programming and need not therefore be explained further.

(2.4) Other Extraction

Extraction processes may be employed to pull material from other electronic databases external to the knowledge management system and store the relevant information in one or more information banks. The exact processes for undertaking these tasks will vary for each source but would typically follow a process similar to that outlined in component 2.1 Internet Search Extraction. These extraction processes could be easily created by a person skilled in the area of computer programming and need not therefore be explained further.

(3) Cataloguing Phase

Figure 9:
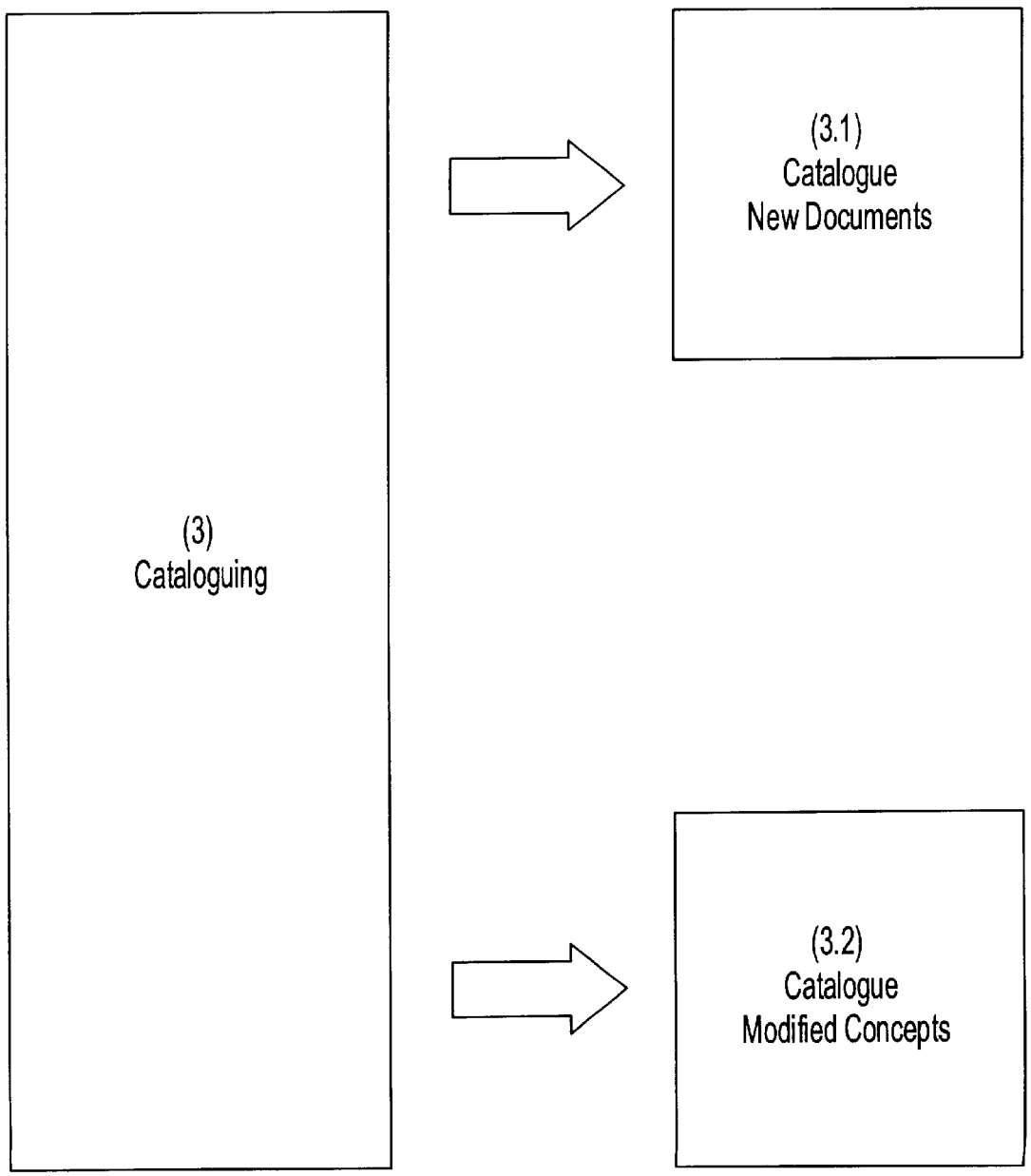
FIG. 9 is a functional block diagram showing key components of a preferred embodiment of the cataloguing phase shown in FIG. 2.

A preferred embodiment of the cataloguing phase, as outlined in FIG. 9, may include two components, being cataloguing of new documents (3.1) and cataloguing of modified concepts (3.2).

(3.1) Catalogue New Documents

Cataloguing of new documents may be executed periodically at a time and frequency determined by an administrator of the system. The purpose of such a process is to ensure that all new information/knowledge has been catalogued to identify which of the currently defined knowledge concepts are present. The concepts found are stored as part of each document. A preferred embodiment of a process to catalogue new documents is outlined in FIG. 10.

Figure 10:
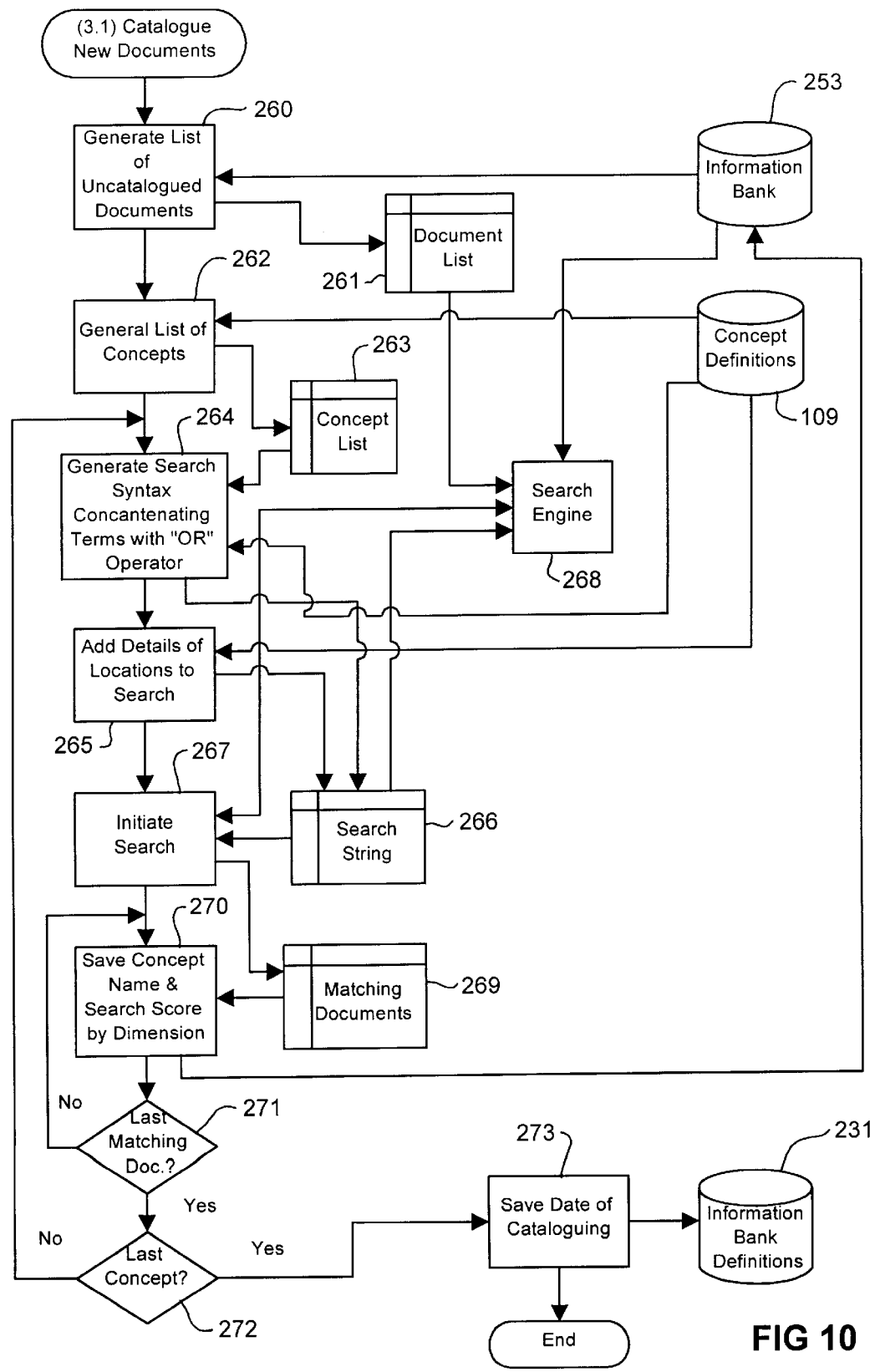
FIG. 10 is a flowchart illustrating the catalogue new documents component of FIG. 8.

Referring to FIG. 10, a list of all the documents not presently catalogued within an information bank 253 is established 260 and saved 261. A list of knowledge concepts 262, 263 currently in use is then processed in turn.

For a given concept a search string 266 is created 264 by concatenating the terms contained in the knowledge concept definition 109 using a logical "OR" operator. Where a knowledge concept has been defined by way of expressions, these expressions may be used. If only certain locations within documents are to be searched (e.g. title) the search string 266 is modified 265 to reflect this. A search is then conducted 267 of the list of uncatalogued documents 261 using the appropriate search engine 268. The search engine is responsible for passing back a list of documents 269 that match the search criteria specified by the search string 266, as well as a search score as to how well each document matches. The knowledge concept name and search score are then saved 270 in the information bank 253 in a special catalogue section of the document. The saved concept names are grouped according to the dimensions for which each concept applies.

On completion of the processing all concepts 271, 272, details of the date and time of the cataloguing process are saved 273 in the appropriate information bank definition 231. The whole process is then repeated for each information bank.

(3.2) Catalogue Modified Concepts

Cataloguing of modified concepts may be executed periodically at a time and frequency determined by an administrator of the system. The purpose of this process is to ensure that all information/knowledge has been recatalogued to reflect additions or changes made to existing concept definitions. A preferred embodiment of a process to catalogue modified concepts is outlined in FIGS. 11A and 11B, taken together.

Figure 11A:
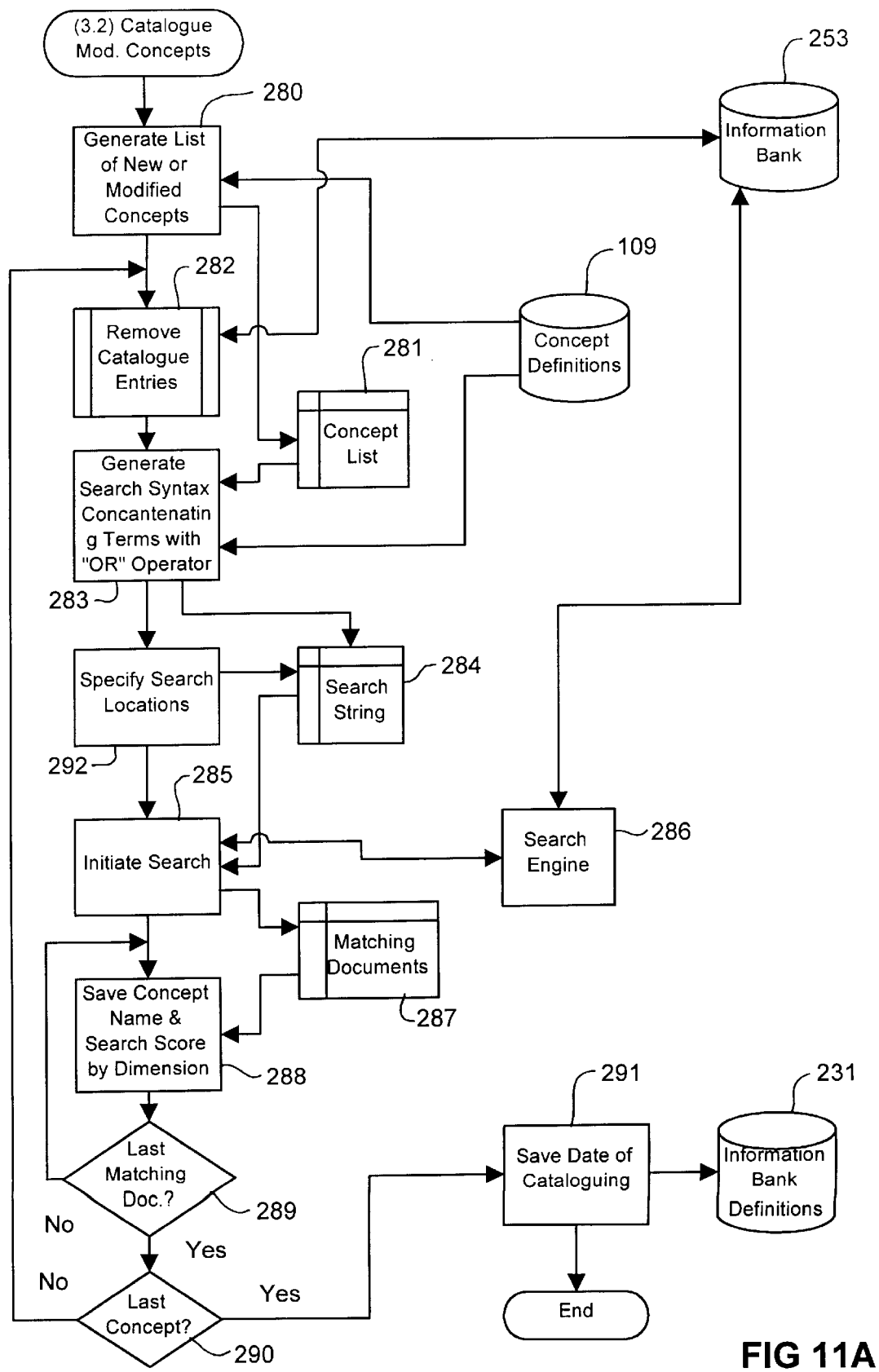
FIGS. 11a and 11b, taken together, is a flowchart illustrating the catalogue modified concepts component of FIG. 9.
Figure 11B:
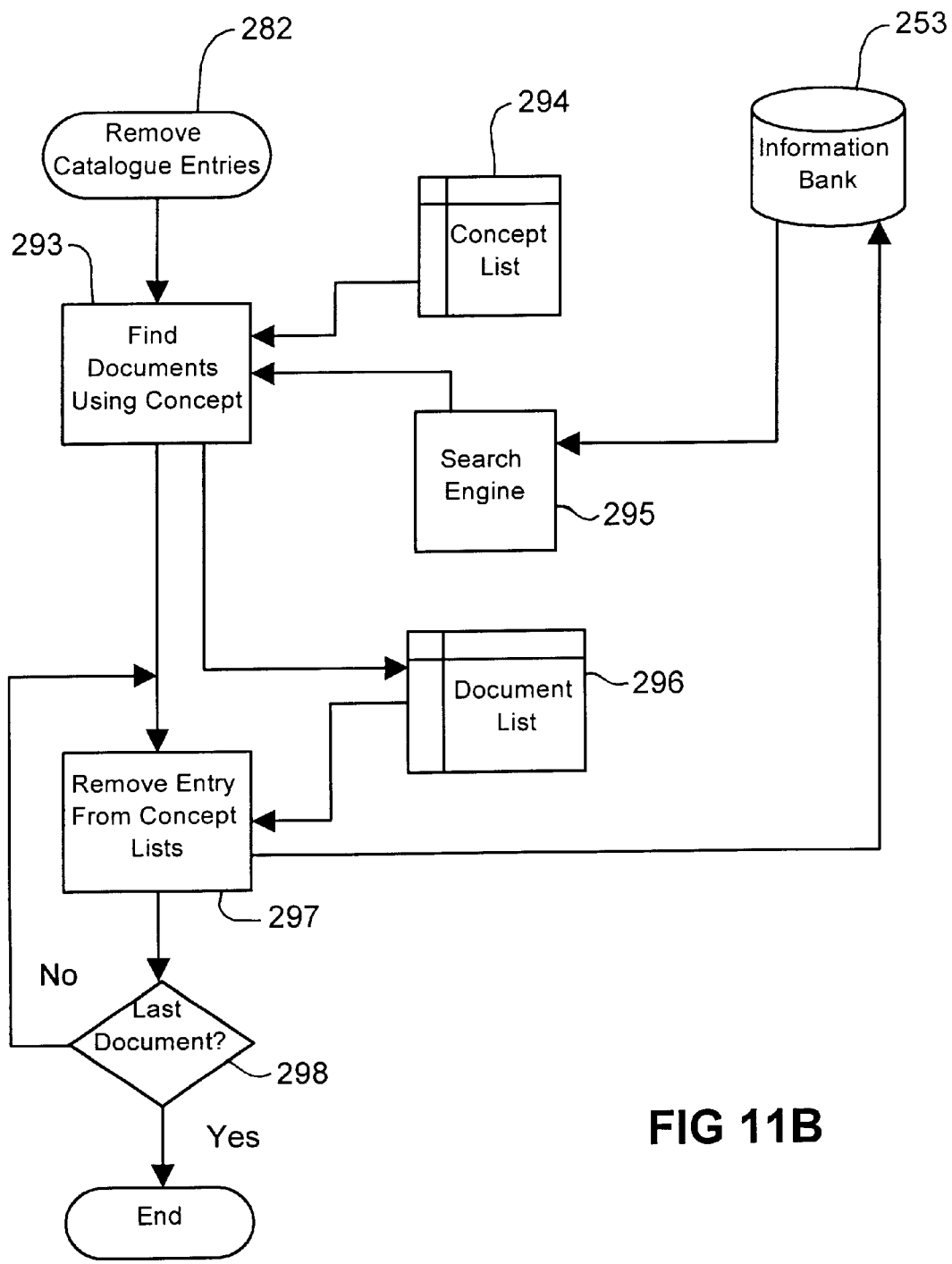

Referring to FIGS. 11A and 11B, a list of concepts added or modified since this process was last executed is generated 280, 281, with each concept in the list 281 processed in turn.

For a given concept, a search string 284 is created 283 by concatenating the terms contained in the knowledge concept definition 109 using a logical "OR" operator. Where a knowledge concept has been defined by way of expressions, these expressions are used. If only certain locations within documents are to be searched (e.g. title) the search string 284 is modified 292 to reflect this. A search is then conducted 285 on all documents in an information bank using the appropriate search engine 286. The search engine 286 is responsible for passing back a list of documents 287 that match the search criteria specified by the search string 284, as well as a search score as to how well each document matches. The knowledge concept name and search score are then saved 288 in the information bank 253 in the special catalogue section of the document. The saved concept names are grouped according to the dimensions for which each concept applies.

On completion of the processing all concepts 289, 290, details of the date and time of the cataloguing process are saved 291 in the appropriate information bank definition 231. The whole process is then repeated for each information bank.

Catalogue entries of concepts may be removed 282 by generating a list (via a search engine 295) of documents 296 that currently have a particular concept 294 listed in its catalogue section. For each document found 293, 298, the catalogue entry is deleted 297 from the concept list in the catalogue section of the document. The modified document is then saved back into the information bank (not shown).

(4) Valuation Phase

Figure 12:
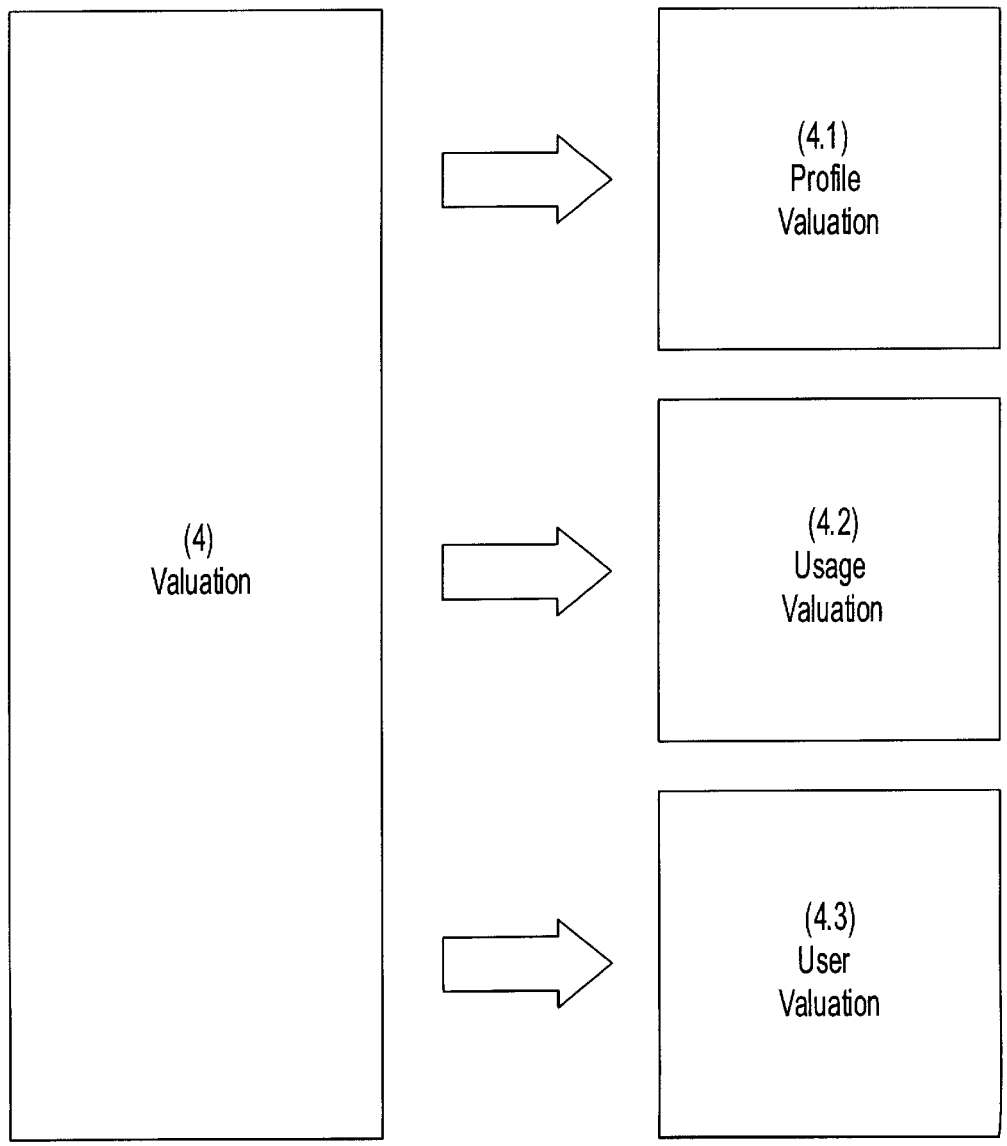
FIG. 12 is a functional block diagram showing key components of a preferred embodiment of the valuation phase shown in FIG. 2.

A preferred embodiment of the valuation phase, as outlined in FIG. 12, brings together three valuation components, being: profile valuation (4.1), usage valuation (4.2) and user valuation (4.3), to determine a value for each piece of information/knowledge in terms of its relevance to a number of knowledge requirements, as defined by corresponding knowledge profiles. In other words, a document is not assigned an overall value but rather a series of values based upon how well it matches the needs of a corresponding series of knowledge profiles, as currently defined within the system. In setting a value for a document with respect to a specific knowledge profile, for example, a profile score (4.1) may be compared with a user score (4.3) and the higher of the two scores may then be added to a usage score (4.2) to yield the total value. Other methods may however be used, and may include only one or two of these scores.

These individual scores will now be explained.

(4.1) Profile Valuation

Profile Valuation is a process used to determine how well the content of a document matches knowledge requirements specified in the form of knowledge profiles. A preferred embodiment of a profile valuation process is outlined in FIGS. 13A and 13B.

Figure 13A:
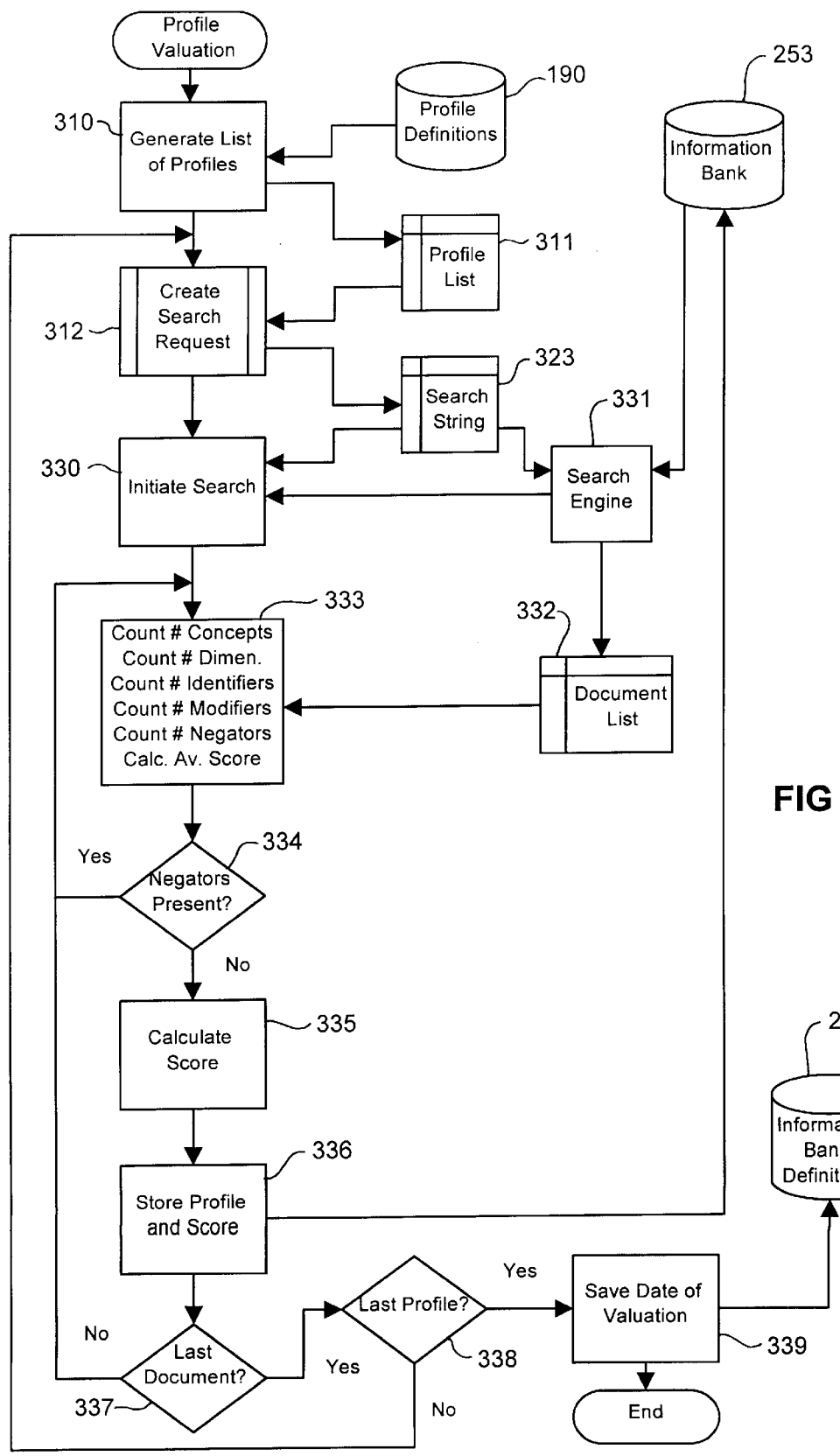
FIGS. 13a and 13b, taken together, is a flowchart illustrating the profile valuation component of FIG. 12.
Figure 13B:
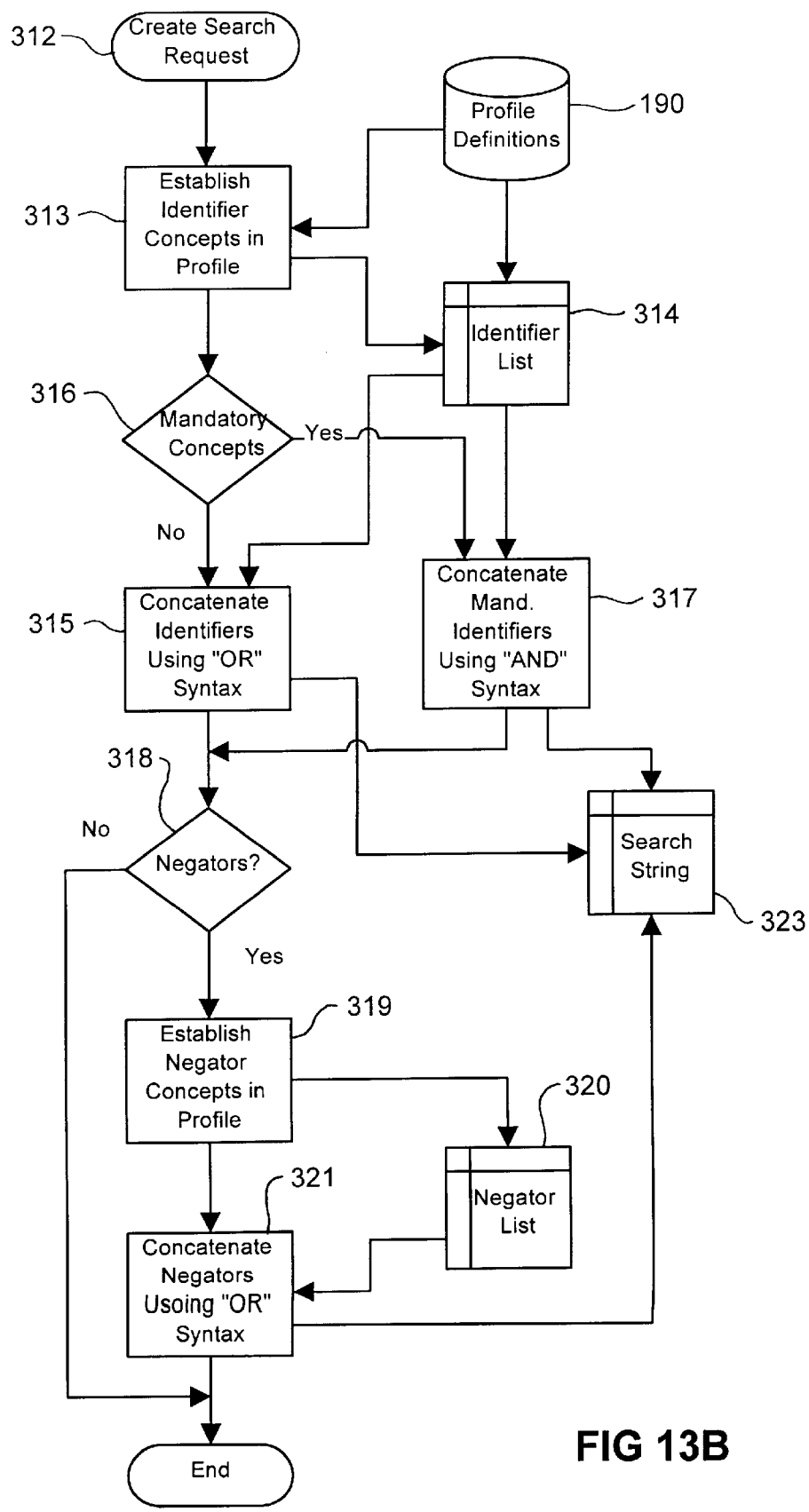

Referring to FIG. 13A, a process is run against each information bank 253 and a list is generated 310, 311 of the knowledge profiles currently defined 190. These profiles are then processed in turn 312.

For a given profile, a first search string is created by first taking each identifying concept 313, 314 (FIG. 13B) listed in the profile 190 and concatenating 315 them using a logical "OR" operator. Alternatively, if certain concepts have been defined as mandatory 316, these alone are used in the first search string concatenated 317 using a logical "AND" operator. If negator concepts are present 318–320 these are concatenated 321 into a second string using a logical "OR" operator. This second search string is then concatenated to the first using a logical "NOT" operator, producing a resultant search string 323. A search is then conducted 330 (FIG. 13A) on the catalogue entries of all documents in an information bank 253 using the appropriate search engine 331. The search engine 331 is responsible for passing back a list of documents 332 that match the search criteria as well as the search score saved at steps 270 and 288 of the cataloguing phase (FIGS. 10 and 11) indicating how well each document matches.

For each document returned from the search, separate counts are taken 333 of: the number of concepts found, the number of dimensions found, the number of identifiers found, the number of modifiers found, the number of negators found and the average search score stored for the concepts found (each individual search score having been calculated in the cataloguing phase, component 3.1). If one or more negators are found 334, the document is skipped. A value is then calculated by determining the number of concepts and dimensions found as a proportion of the total number of concepts and dimension specified in the knowledge profile definition. These are then combined with the average search score and the number of modifiers to produce a "profile score" 335. These components may be brought together in a number of ways and may be weighted in a number of ways. One example is:

Profile Score=(Proportion Dimensions found * 20)+ (Proportion Concepts found * 10) * (1+Average Search Score 100)+(Number of Modifiers * 2)

where average search score=sum of search scores/ Number of concepts.

The knowledge profile name and profile score are then saved 336 in the information bank in a special valuation section of the document.

Once all profiles have been processed in this way 337, 338, the date and time of the valuation are stored 339 in the applicable information bank definition 231.

(4.2) Usage Valuation

Usage valuation is a process used to dynamically modify the valuation of information/knowledge as it is used by individuals. As a document is read, printed or e-mailed, or comments or links attached, counts of these events are recorded as input to the calculation of a new value for the document. A preferred embodiment of a usage valuation process is outlined in FIG. 14.

Stored as part of the definitions 223 of a knowledge base is a weighting index (see component 1.4 and FIG. 6) to be assigned to each type of usage such as:

Document read within current knowledge base (local read)

Document read within another knowledge base (external read)

Comment added to current knowledge base (local comment)

Comment added to another knowledge base (external comment)

The number of times each of these events has occurred is extracted 351 from the document in the knowledge base 352 and a "usage score" calculated 353 and stored 354 back in the document in the knowledge base 352.

One example of a usage valuation calculation for reading of documents is as follows:

Usage Score=(Number of local reads * Local Read Weighting Index)/100+(Number of external reads External Read Weighting Index)/100

A similar calculation may be used for the adding of comments to documents.

In alternative embodiments, additional or alternative usage information may be used. For example, the number of times a document is printed, the number of links created to other documents or the number times the document is e-mailed may be counted and included in the calculation of the usage score. Different weightings may be assigned to each type of usage.

(4.3) User Valuation

User valuation is a process allowing a user to make a subjective assessment of a document by nominating a rating reflecting how well the content of the document matches the intended need, as opposed to the need defined by the associated knowledge profile. A preferred embodiment of a user valuation process is outlined in FIG. 15.

Figure 15:
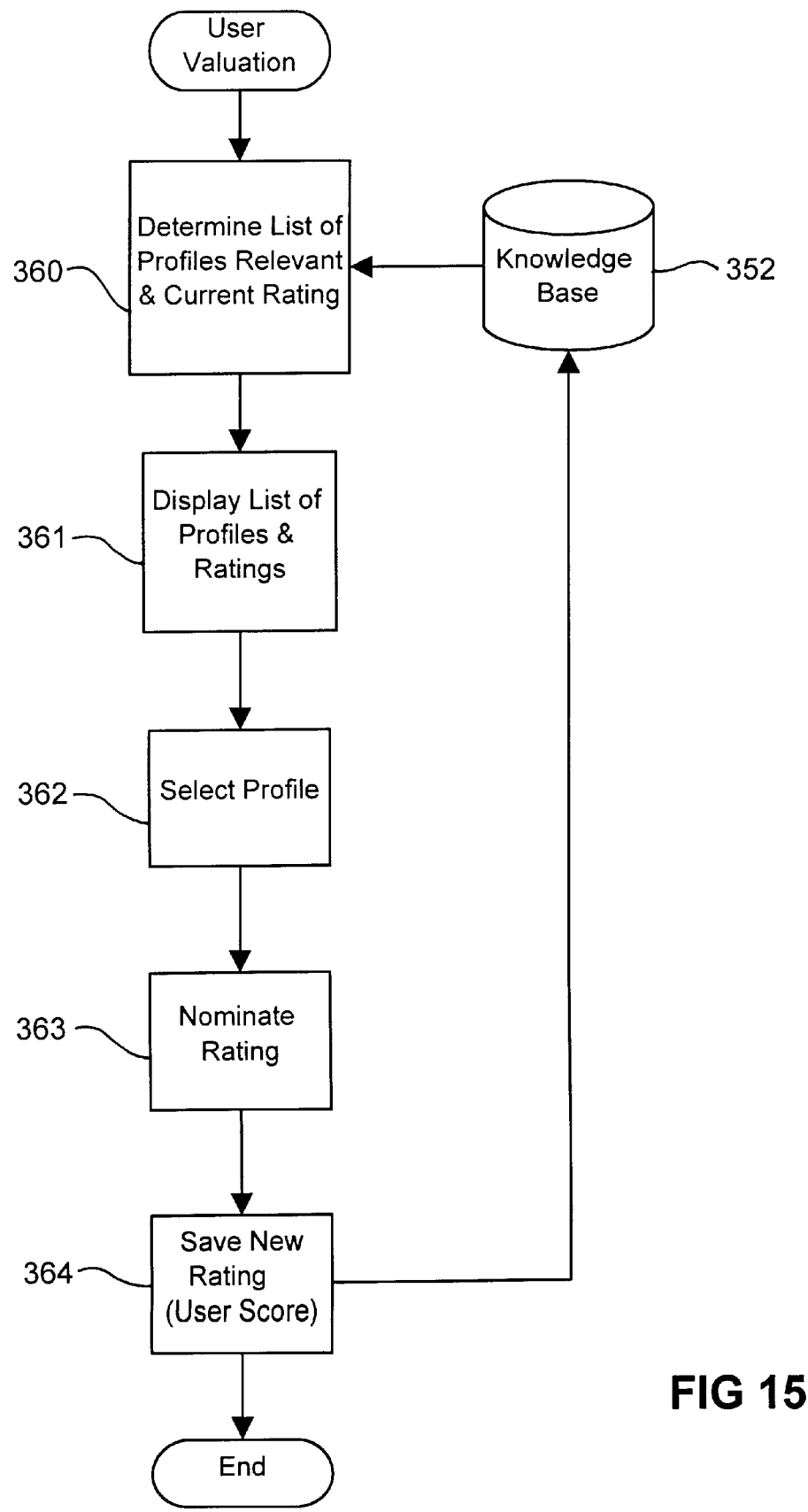
FIG. 15 is a flowchart illustrating the user valuation component of FIG. 12.

Referring to FIG. 15, when a user chooses to rate a document, a list of knowledge profiles 360 relevant to the document is displayed 361 for the user to select one 362. The current user rating (if any) for the selected profile is displayed and the user can then nominate 363 a new rating for the document. The new rating, or "user score", is then saved 364 against the selected knowledge profile back in the knowledge base in the document being reviewed.

(5) Delivery Phase

Figure 16:
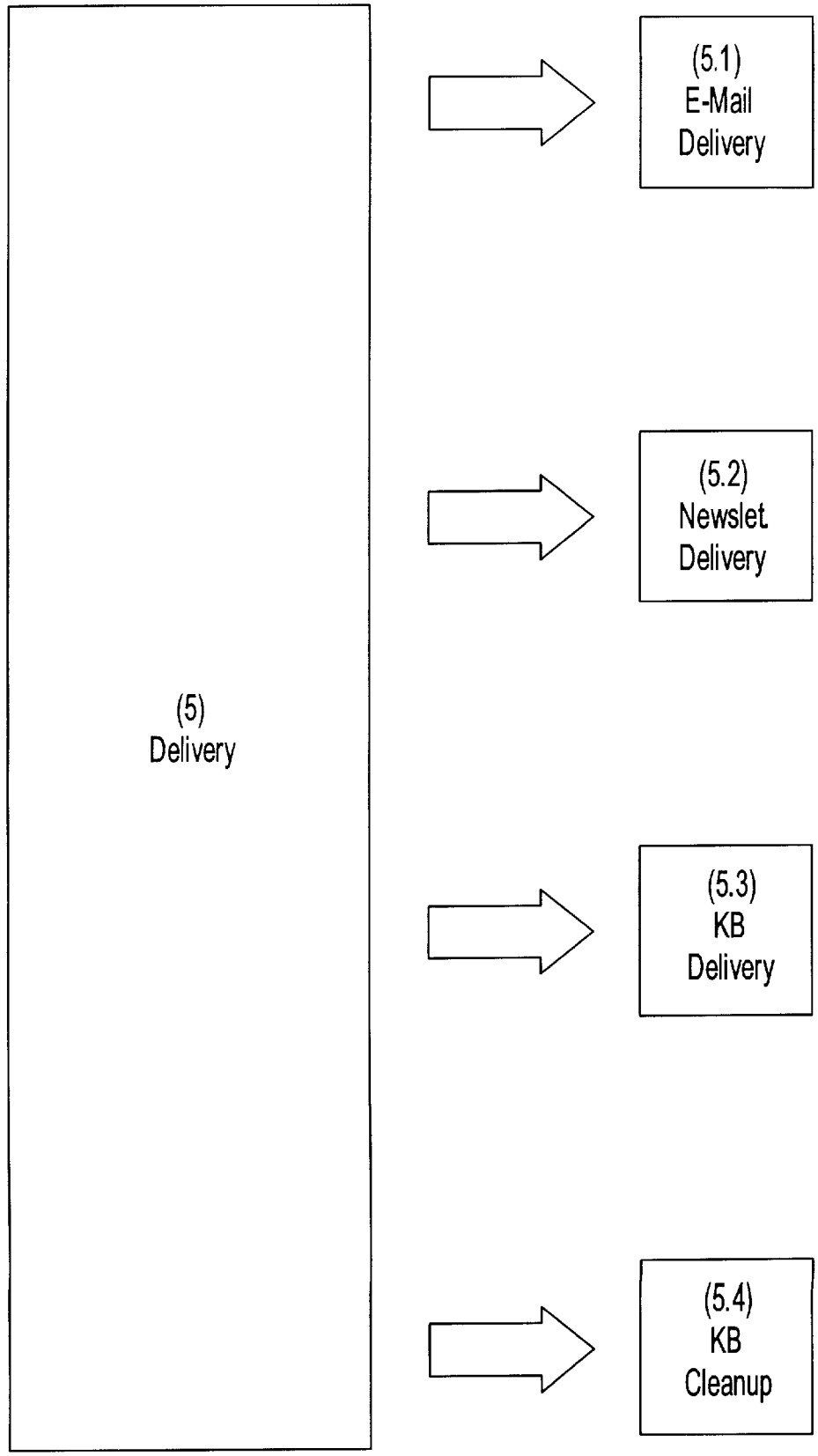
FIG. 16 is a functional block diagram showing key components of a preferred embodiment of the delivery phase shown in FIG. 2.

The delivery phase is responsible for taking information/ knowledge from a series of information banks and delivering them in electronic form to those people who have a nominated interest. As overviewed in FIG. 16, a preferred embodiment of such a phase may include four components, being: e-mail delivery (5.1), newsletter delivery (5.2), knowledge base delivery (5.3) and knowledge base cleanup (5.4).

(5.1) E-Mail Delivery

The purpose of E-Mail delivery is to deliver each relevant document to a group of people as separate electronic mail messages. The process of taking each document and sending it to a list of people could be easily created by a person skilled in the area of computer programming and need not therefore be explained further.

(5.2) Newsletter Deliver

The purpose of newsletter delivery is to take a group of relevant documents and link them together into one electronic mail message which contains a brief summary of each document (e.g. title) and an electronic link to the full content of each document. This reduces the number of e-mail messages received by each person using the system.

The process of delivering relevant documents via a newsletter format could be easily created by a person skilled in the area of computer programming and need not therefore be explained further.

(5.3) Knowledge Base Delivery

Figure 17:
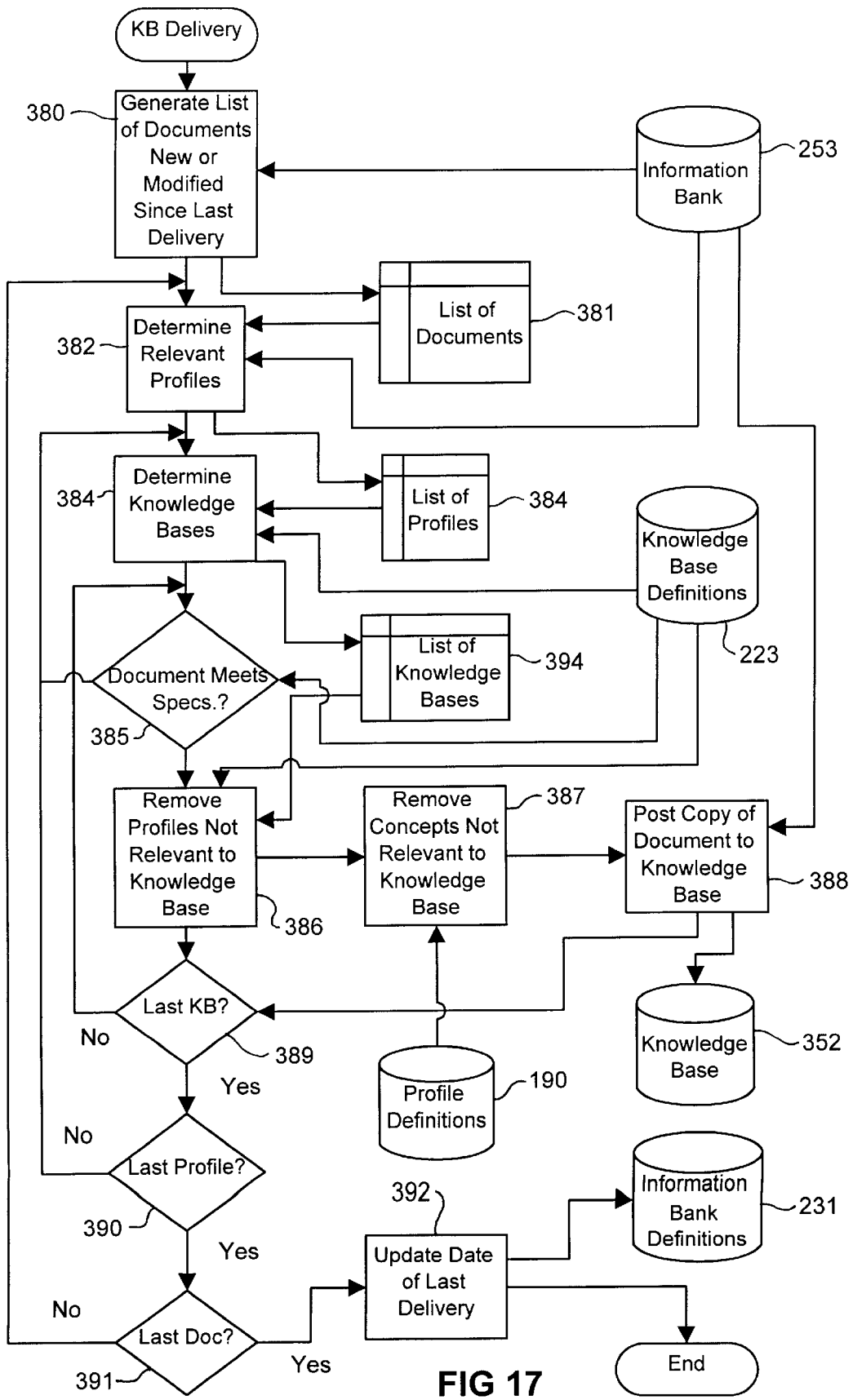
FIG. 17 is a flowchart illustrating the knowledge base delivery component of FIG. 16.

A preferred embodiment of a process to deliver information/knowledge to a knowledge base is outlined in FIG. 17.

Referring to FIG. 17, a list of documents within an information bank 253, new or modified since the last delivery operation, is established 380, 381. For each document in the list:

The knowledge profiles for which the document matches are extracted 382, 383 from the document, the profile names having been stored during the profile valuation component 4.1 (step 336 in FIG. 13A). Those profile names are then searched in the knowledge base definitions database to determine 384, 394 which, if any, knowledge bases are currently used by the knowledge profiles.

For each knowledge base 389 a comparison 385 is made with the knowledge base definitions 223 to determine if the profile and the document value for that profile, calculated in the valuation phase (phase 4), meet the criteria specified in the knowledge profile definition (see component 1.2 and steps 185–189 of FIG. 5C). If so, a copy of the document is taken and the list of profiles and concepts stored in the document are amended, 386, 387 respectively, to remove those not relevant to the needs of the knowledge base 352. The modified copy of the document is then pasted 388 to the knowledge base 352. After all profiles 390 and all documents 391 have been processed an entry is made 392 in the information bank definitions database 231 recording the date and time of the delivery.

(5.4) Knowledge Base Cleanup

Figure 18:
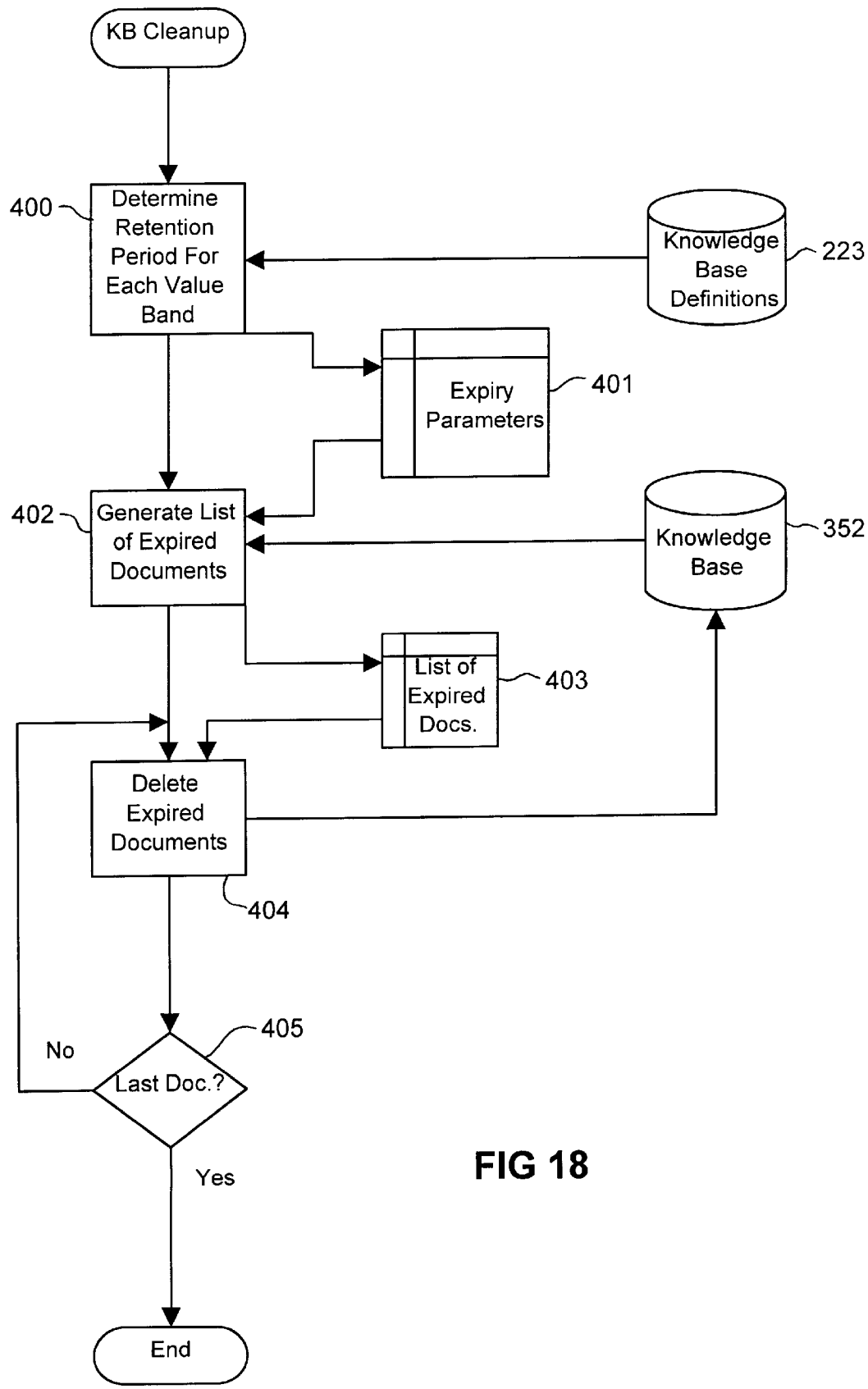
FIG. 18 is a flowchart illustrating the knowledge base cleanup component of FIG. 16.

A preferred embodiment of a process to cleanup a knowledge base is outlined in FIG. 18.

Referring to FIG. 18, retention periods are extracted 400 from the knowledge base definitions database 223 for each value band (refer component 1.4). For each document in the knowledge base 352 it is possible to establish the expiration date by adding the appropriate retention period (as determined by the document's value) to the date the document was added to the knowledge base. Those documents whose expiry dates are on or before the current date are then separated out 402, 403 and deleted 404, 405.

(6) Interaction Phase

Figure 19:
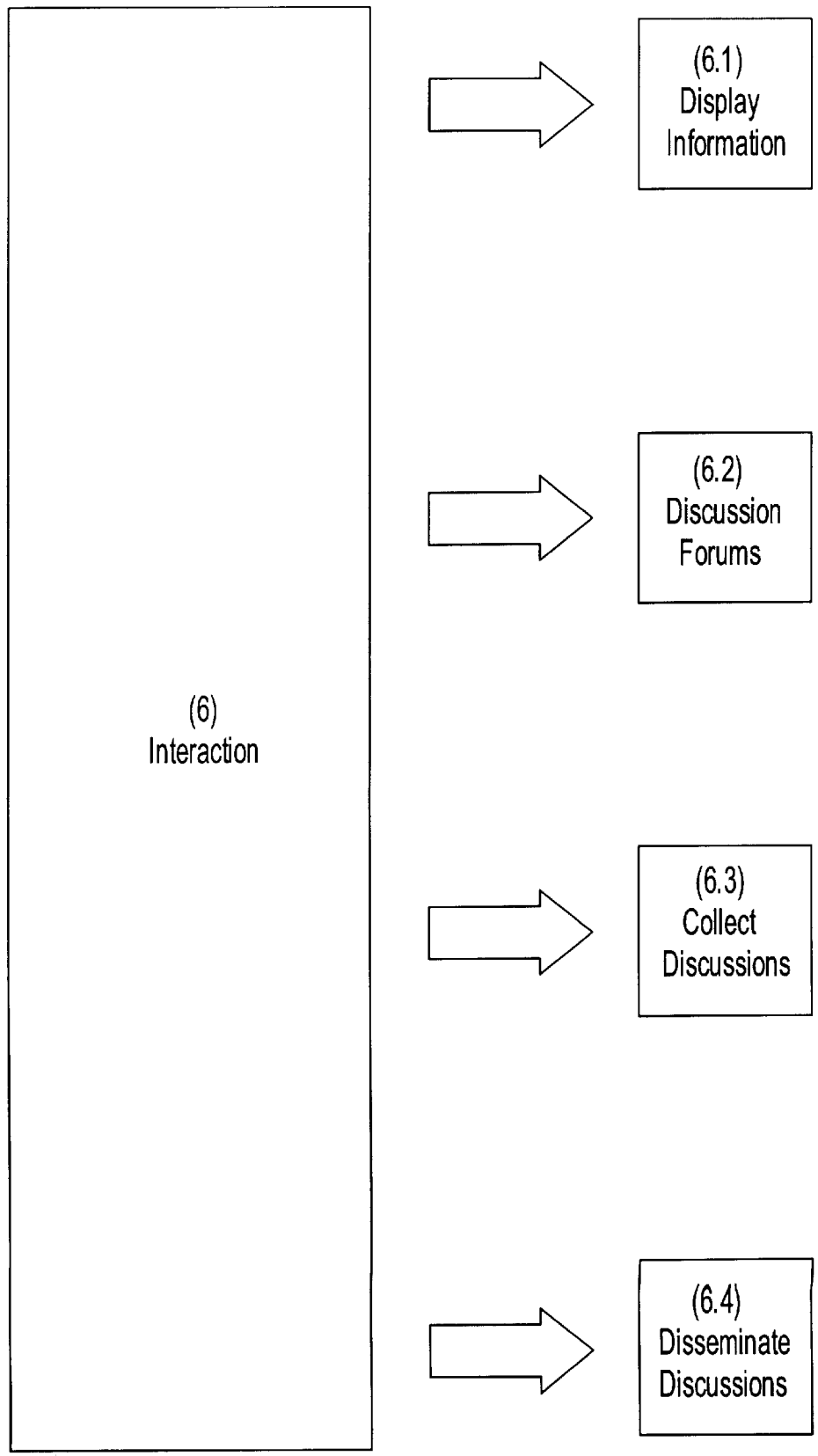
FIG. 19 is a functional block diagram showing key components of a preferred embodiment of the interaction phase shown in FIG. 2.

A preferred embodiment of a process for completing the interaction phase, as outlined in FIG. 19, brings together a number of components, of which four will be specifically described. These are: display information (6.1), discussion forums (6.2), collect discussion forums (6.3), and disseminate discussion forums (6.4).

The primary purpose of the interaction phase is to promote discussion and interaction between users of information/knowledge contained within a knowledge base so that it can subsequently be shared as a resource by the organization as a whole.

(6.1) Display Information

Figure 20:
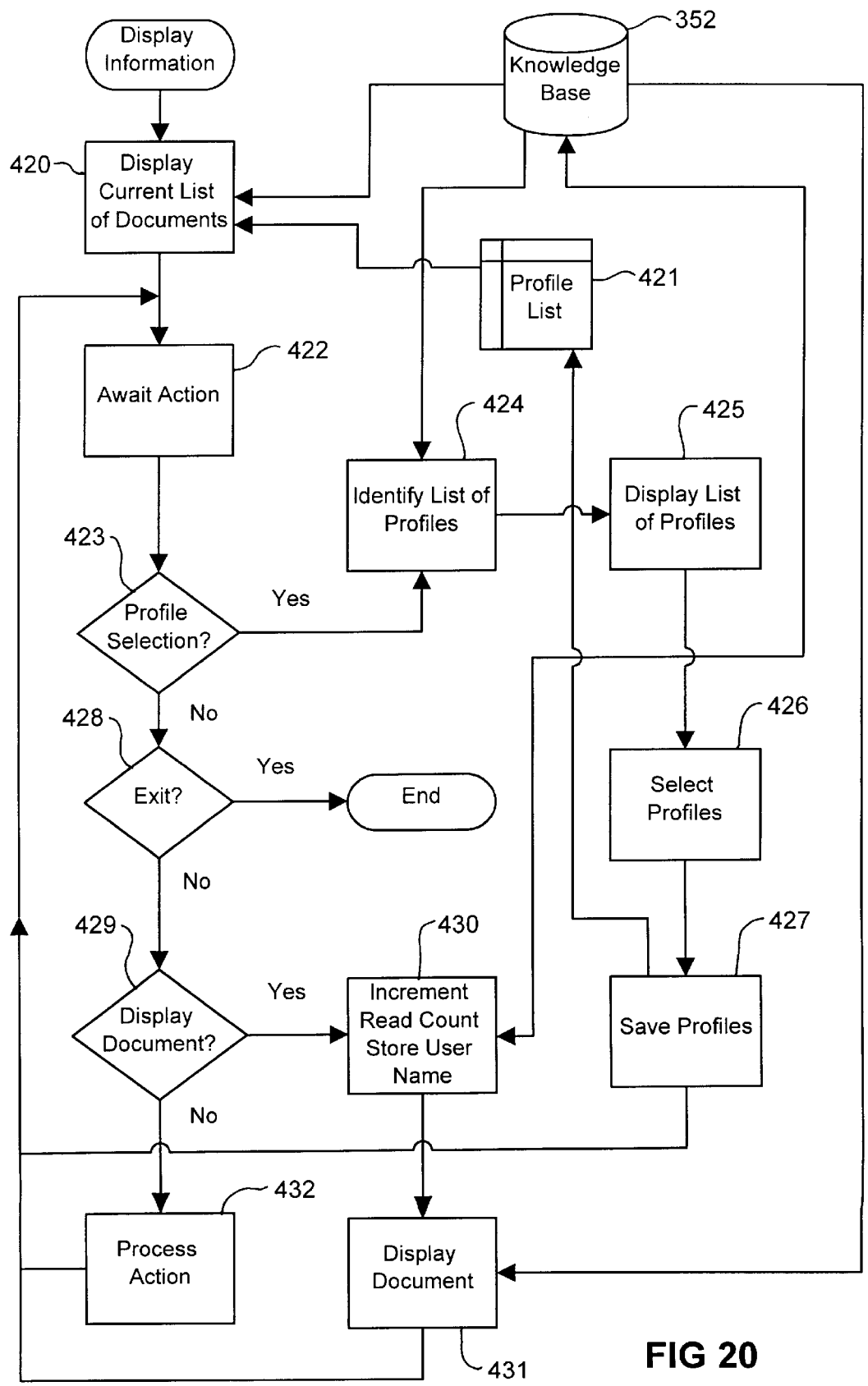
FIG. 20 is a flowchart illustrating the display information component of FIG. 19.

A preferred embodiment of a process to display information relevant to a knowledge base is outlined in FIG. 20.

Referring to FIG. 20, the current contents of a knowledge base 352 are displayed 420 to the user based upon a currently defined list 421 of knowledge profiles of interest. This list 421 specifies only those profiles of interest to this particular user and may be a subset of the profiles used by the knowledge base. If a user requests 422, 423 to modify the profile list 421, he/she is presented 424, 425 with a list of profiles currently used by the knowledge base 352. The user then selects 426 one or more of these profiles which are then saved 427 for later use in the display of documents. The list of displayed documents 420 is then adjusted to reflect only those documents that relate to the selected profiles in the modified profile list 421.

Should a user wish to review a document 429 a counter recording the number of times the document has been read is incremented 430 and stored back in the document. The document is then presented 431 for the user to review. A range of other actions, such as highlighting of text for a summary, may also be processed 432, or the user may exit 428 the display component.

(6.2) Discussion Forums

The purpose of discussion forums is to allow for electronic recording of comments/thoughts generated as a result of reading a document. This is facilitated through the creation of one or more comments about a document which are attached electronically to the original document, each as a separate document. It is further possible for responses to be made to comments posted, which are then stored as further documents and linked to the comment/response to which they relate.

Typically the process for enabling the creation and storage of such electronic discussions would be contained within specialised software packages known as groupware. A person skilled in computer programming could be expected to easily link such groupware functionality into the knowledge management system of the invention and it is therefore considered that a detailed explanation is unnecessary.

(6.3) Collect Discussion Forums

Figure 21:
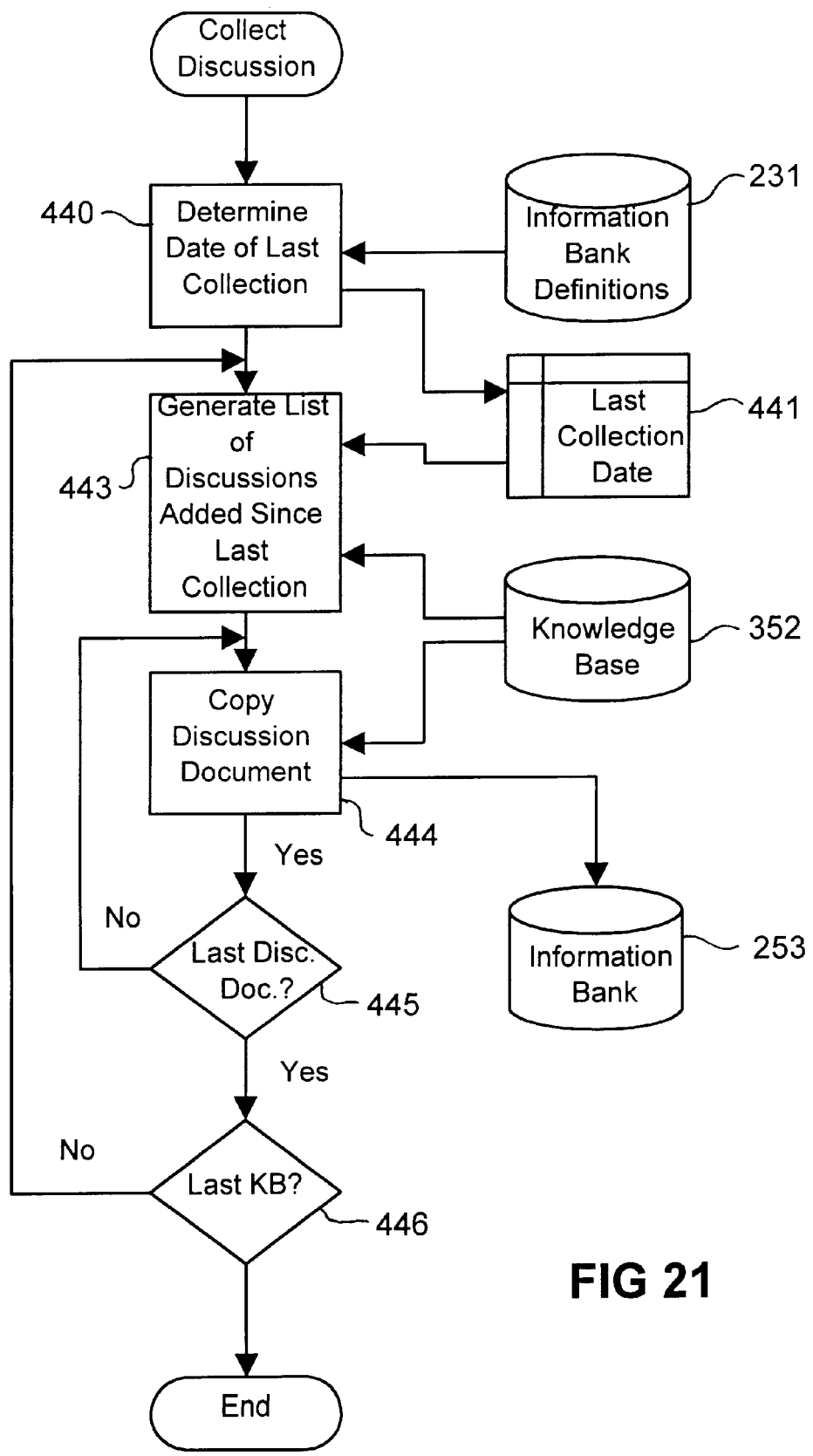
FIG. 21 is a flowchart illustrating the collect discussion forums of FIG. 19.

A preferred embodiment of a process to collect discussion forum documents (comments and/or responses) from knowledge bases is outlined in FIG. 21. The purpose of this process is to ensure all comments added to a document are collected in a central repository (eg. in an information bank) for later dissemination, given that copies of the document may be held in a multitude of knowledge bases.

Referring to FIG. 21, the date of the last collection of comments is extracted 440, 441 from the information bank definition database 231. A list of discussions added or modified since that date is then generated 443. Copies of these discussion documents (comments and/or responses) are then added/replaced 444 into the information bank 253 from which the document originated (determined by a link stored in the knowledge base copy 352 of the document). The process is repeated for each discussion document 445 and then each knowledge base 446.

(6.4) Disseminate Discussion Forums

Figure 22:
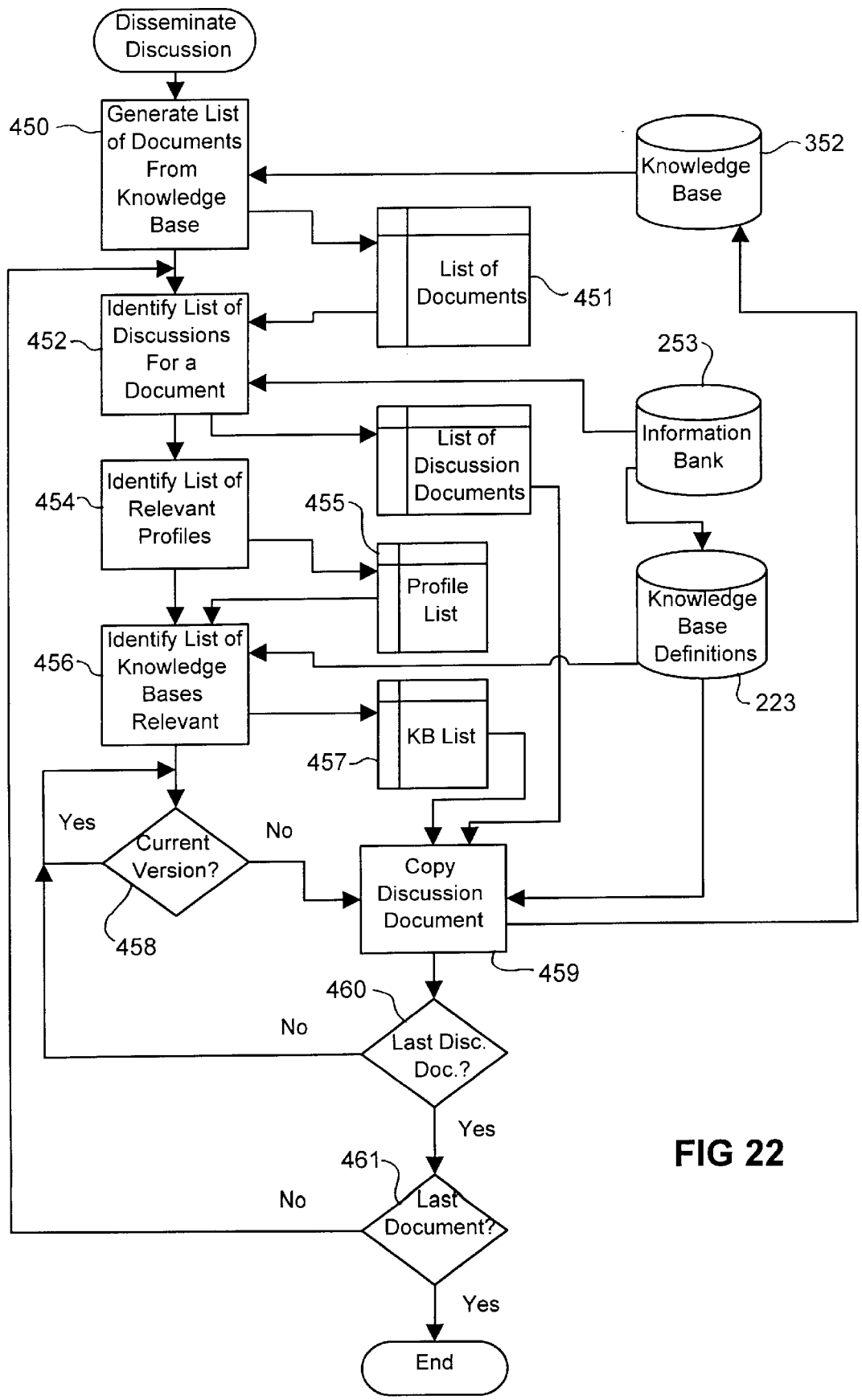
FIG. 22 is a flowchart illustrating the disseminate discussion forums component of FIG. 19.

The preferred embodiment of a process to disseminate discussion forums to all relevant knowledge bases is outlined in FIG. 22. The purpose of this process is to ensure discussion forums are shared across all knowledge bases that share the corresponding base documents.

Referring to FIG. 22, a list of base documents with discussion forums attached is generated 450, 451. For each of these documents a list of discussion documents is identified 452, 453 as well as a list of knowledge profiles that relate to the document 454, 455. From this list of knowledge profiles it is possible to identify the relevant knowledge bases that currently use each knowledge profile 456, 457. For each knowledge base comparison is made of each discussion document 458. Where the knowledge base does not have a discussion document it is added 459. If the knowledge base does not have the latest copy of the discussion document, the older copy is replaced. The process is repeated for each discussion document 460 and then each base document 461.

(7) Analysis & Summary Phase

Figure 23:
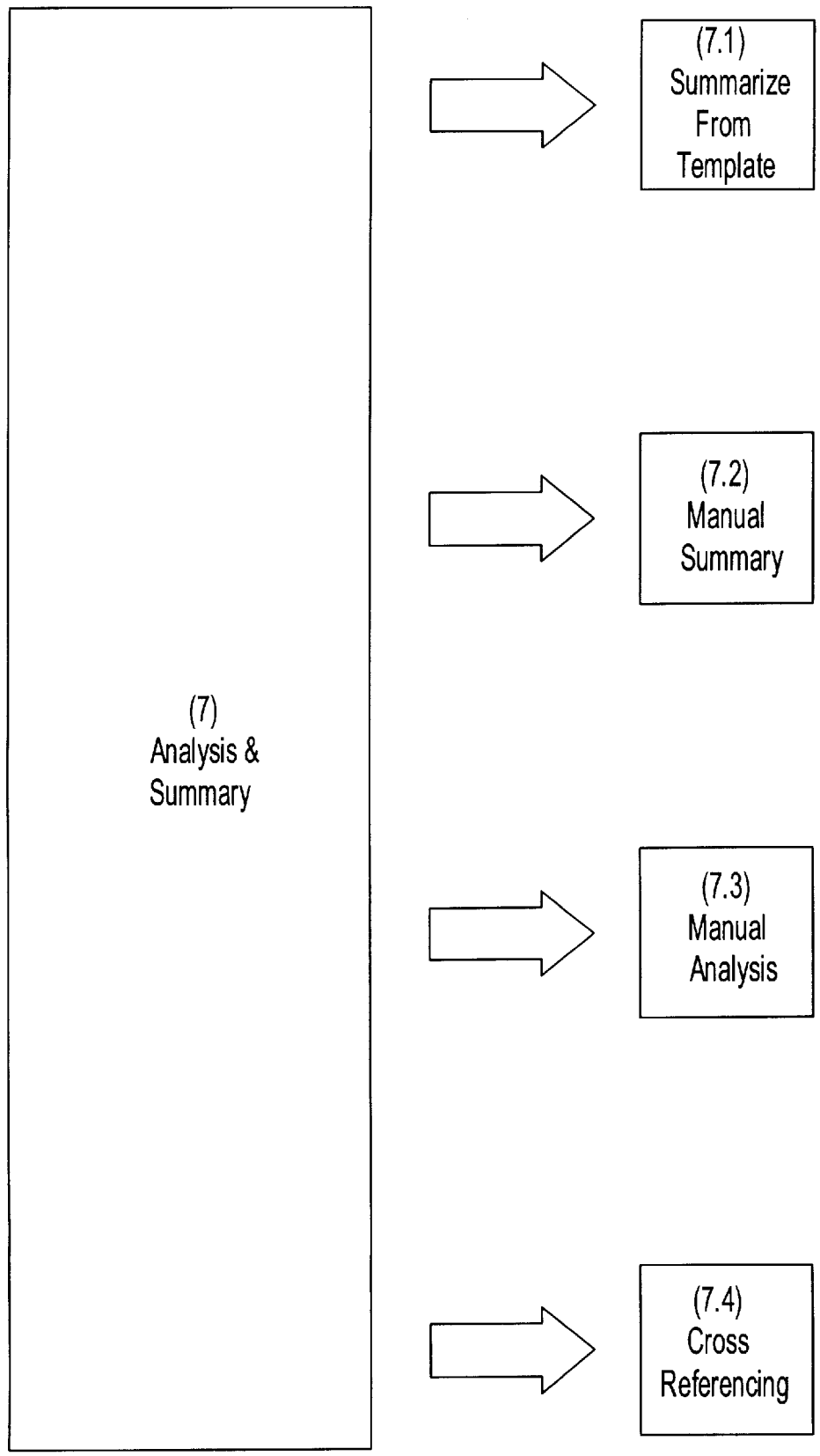
FIG. 23 is a functional block diagram showing key components of a preferred embodiment of the analysis/summary phase shown in FIG. 2.

An analysis & summary phase facilitates creation of knowledge from base information/knowledge contained within a knowledge base. This may be achieved by allowing the user to select information from existing documents to be included in a new document. FIG. 23 shows a preferred embodiment of such a process which may include four components, being: summarize from template (7.1), manual summary (7.2), manual analysis (7.3) and cross referencing (7.4). Other embodiments may employ a range of techniques consistent with the principles of the invention.

(7.1) Summarize Via Template

Figure 24:
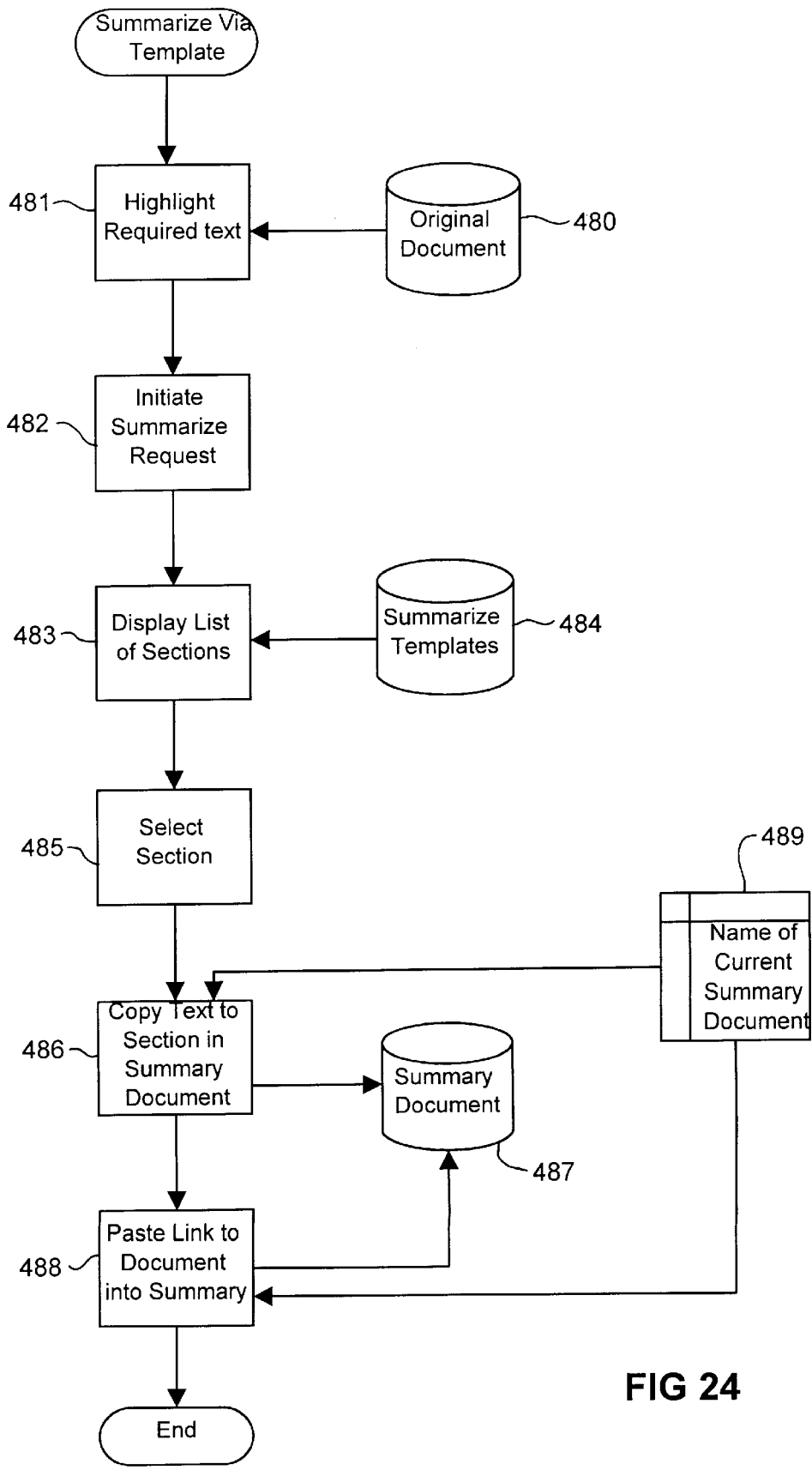
FIG. 24 is a flowchart illustrating the summarise via template component of FIG. 23.

The preferred embodiment of a process to prepare summaries via a template is outlined in FIG. 24. The purpose of this process is to enable an electronic summary to be prepared by automating the task of extracting source material (eg. a part of a document) and electronically pasting that material into a summary document along with an electronic link back to the source material.

In preparing a summary, as shown in FIG. 24, a user may read a number of documents 480 contained within a knowledge base. Text considered by the user to be of use in the summary is highlighted 481 and then a request 482 to include the highlighted material in the summary is made. A list is provided 483 from a summary template 484 of the sections contained within the summary and the user selects 485 one as the destination of the text. The text is then electronically copied 486 into the selected section of the summary document 487 along with an electronic pointer (link) 488, 489 back to the original material. At a subsequent stage the user can then enter the summary document 487 to add new material and arrange the existing material.

(7.2) Manual Summary

A process of manual summarization involves reading the material and then putting together a summary of the material in the form of a document using computer based word processing software. The process for providing a link between a word processor and the knowledge management system could be easily created by a person skilled in computer programming and need not therefore be explained further.

(7.3) Manual Analysis

A process of manual analysis involves reading the material and then putting together an interpretation of the material and its implications within a specific context. This analysis would then be expressed electronically in the format of a document/report using computer based word processing software. The process for providing a link between a word processor and the knowledge management system could be easily created by a person skilled in computer programming and need not therefore be explained further.

(7.4) Cross Referencing

The purpose of cross referencing is to provide a mechanism to electronically link text contained within one document to text in other documents that are related in some way (e.g. a reference). The process of linking text between documents could be easily created by a person skilled in computer programming and need not therefore be explained further.

(8) Adaptive Learning Phase

Figure 25:
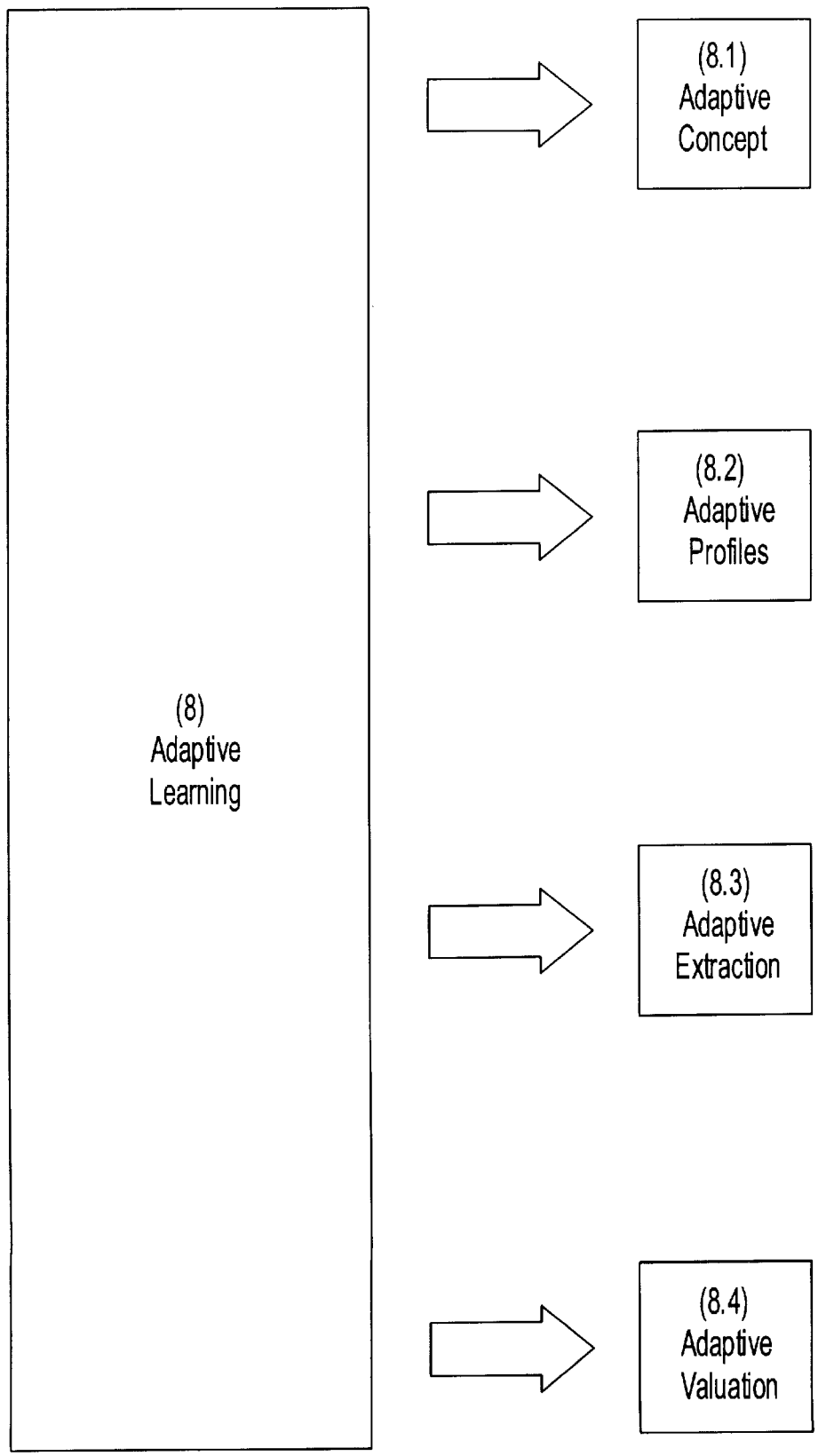
FIG. 25 is a functional block diagram showing key components of a preferred embodiment of the adaptive learning phase shown in FIG. 2.

An adaptive learning phase enables the knowledge management system to adapt the way it operates by learning from current usage. As outlined in FIG. 25, a preferred embodiment of such a process may include four components, being: adaptive concept (8.1), adaptive profiles (8.2), adaptive extraction (8.3) and adaptive valuation (8.4).

8.1 Adaptive Concepts

Figure 26:
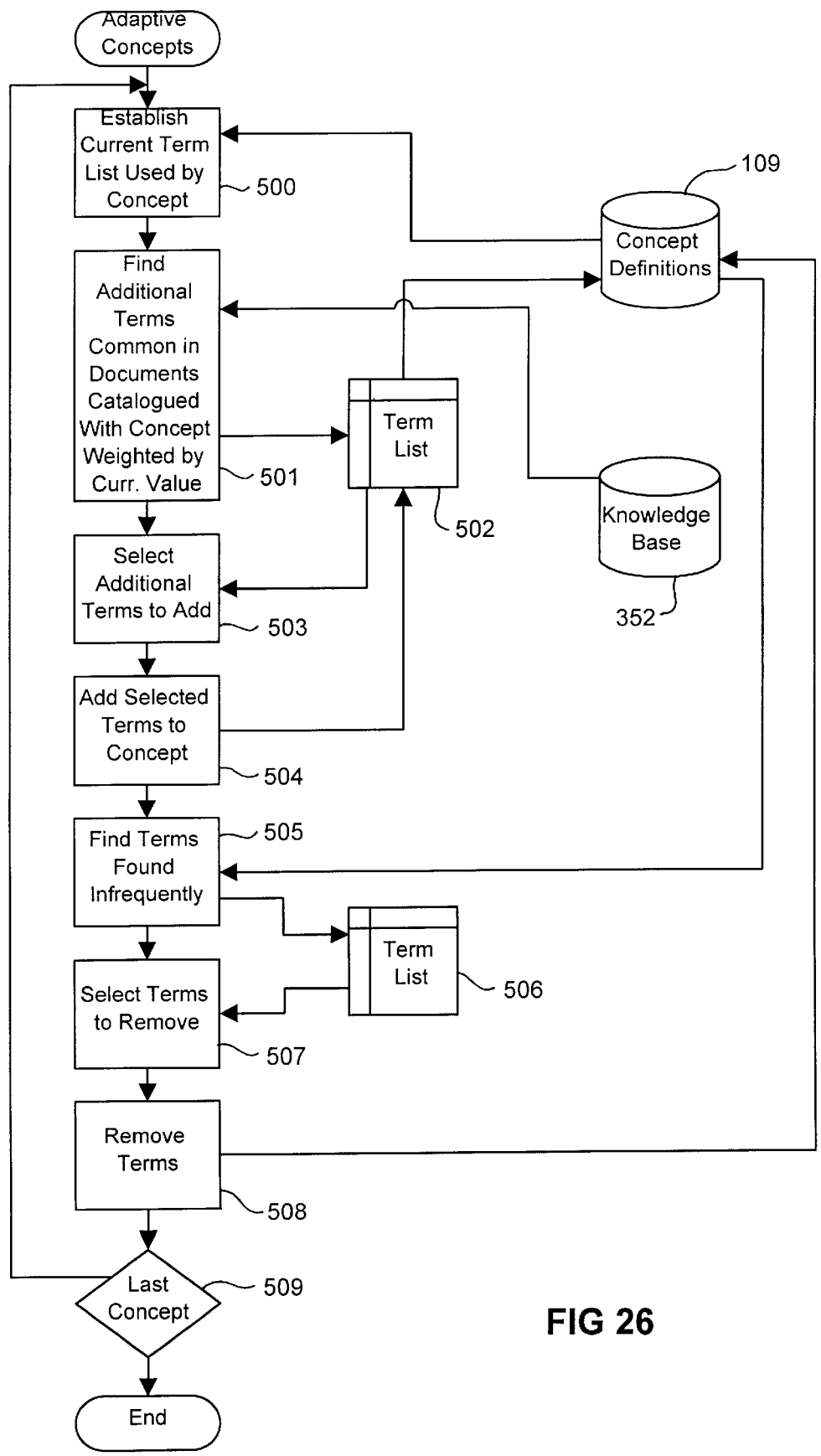
FIG. 26 is a flowchart illustrating the adaptive concept component of FIG. 25.

A preferred embodiment of a process to adapt concepts is outlined in FIG. 26. The purpose of this process is to learn from the most often used and highly valued material catalogued under a particular concept to allow the concept definitions to be modified to better match user needs.

Referring to FIG. 26, a current list of terms or expressions used by a concept is extracted 500 from the concept definition database 109. A statistical analysis is then performed 501 on all documents within a knowledge base 352, with a higher weighting given to documents with a higher value. The purpose of this analysis is to identify terms used in these documents not currently included in the knowledge concept definition 109. A list of the most likely terms 502 is presented to the user who can then select 503 additional terms to add 504 to the existing concept definition. Next, an inspection 505 is done on existing terms included in the concept definition 109 which have been rarely found in documents catalogued under the knowledge concept. A list 506 of under-utilized terms is presented to the user who then can elect 507 to have these removed 508 from the concept definition 109. Any amendments made are then saved in the concept definition database 109.

8.2, 8.3, 8.4 Adaptive Profiles, Adaptive Extraction & Adaptive Valuation

These learning processes adapt the operation of various phases of the system based on current usage to enable the system to better match user needs.

Although reference has been made to specific examples and preferred embodiments of the invention, it will be understood by those skilled in the art that various adaptations and modifications may be configured without departing from the spirit and scope of the invention.

What is claimed is:

1. A method of displaying documents held in a database, including the steps of:

accumulating usage information based on prior usage made of each document in the database;

determining a usage score for each document based on the usage information;

assigning a relevance value to each document based at least in part on the usage score;

storing the relevance value to each document based at least in part on the usage score;

storing the relevance value with the respective document;

sorting the documents according to their relevance values; and displaying to a user of the database a list of at least a portion of the sorted documents.

2. The method of claim 1, further including:

establishing and storing a plurality of knowledge related concepts representing a corresponding plurality of subjects, each concept being defined by a set of associated terms which are searchable within documents held in the database;

establishing and storing a knowledge related profile representing a knowledge requirement of the user, the profile being defined by at least a first group of concepts selected from the plurality of concepts;

searching the database for documents which match at least one of the first group of concepts; and determining a profile score for each matched document indicating how well it matches the profile; and wherein the relevance value is based at least in part on the profile score.

3. The method of claim 1, further including:

providing means to enable a user to make a subjective assessment of each document and to nominate a rating reflecting how well it matches a knowledge requirement of the user; and determining a user score based on the nominated rating; and wherein the relevance value is based at least in part on the user score.

4. The method of claim 2, further including:

providing means to enable a user to make a subjective assessment of each document and to nominate a rating reflecting how well it matches the knowledge requirement; and determining a user score based on the nominated rating; and wherein the relevance value is based at least in part on the user score.

5. The method of claim 1, further including assigning a weighting to each of a plurality of usage types, and wherein the step of accumulating usage information includes determining the number of events for each usage type, and wherein the usage score is determined as a function of the weighting and number of respective events for each usage type.

6. The method of claim 5 wherein the usage types include reading the document or adding comments to the document.

7. The method of claim 5 wherein the usage types include printing the document, e-mailing the document or creating links to other documents.

8. The method of claim 1, further including defining a minimum relevance value, and wherein the displayed list of documents includes only those documents having a respective relevance value greater than the minimum relevance value.

9. The method of claim 1, further including:

determining a retention period for each document based on the respective relevance value for the document; and removing the document from the database upon expiry of the retention period.

10. The method of claim 2 wherein the step of establishing the concepts includes associating with each concept one or more dimensions which indicate the context in which the concept is applied by the user, wherein the step of establishing the profile thereby associates with the profile the dimensions which are associated with the first group of concepts, and wherein the method further includes counting the number of dimensions associated with the profile which are found in each matched document, and wherein the profile score is determined as a function of the number of dimensions found.

11. The method of claim 10 wherein the dimensions include companies/organizations, industries, products, locations, topics, time periods and people.

12. The method of claim 2, further including counting the number of the first group of concepts which are found in each matched document, and wherein the profile score is determined as a function of the number of the first group of concepts found.

13. The method of claim 12 wherein the step of establishing the profile includes defining a second group of concepts selected from the plurality of conepts, and wherein the method further includes counting the number of the second group of concepts which are found in each matched document, and wherein the profile score is determined, at least in part, as a function of the number of the second group of concepts found.

14. The method of claim 13 wherein the step of establishing the profile includes defining a third group of concepts selected from the plurality of concepts; and wherein the displayed list of documents is classified according to the third group of concepts.

* * * * *